US011519517B1

(12) United States Patent
Virdone et al.

(10) Patent No.: US 11,519,517 B1
(45) Date of Patent: Dec. 6, 2022

(54) FLUIDIC DEVICES WITH PIEZOELECTRIC ACTUATORS AND RELATED METHODS

(71) Applicant: META PLATFORMS TECHNOLOGIES, LLC, Menlo Park, CA (US)

(72) Inventors: Nicole Kathleen Virdone, Pasadena, CA (US); Sabrina Sandoval, San Gabriel, CA (US); Riccardo DeSalvo, Los Angeles, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 236 days.

(21) Appl. No.: 16/845,272

(22) Filed: Apr. 10, 2020

(51) Int. Cl.
    *F16K 11/07*      (2006.01)
    *F16K 31/00*      (2006.01)

(52) U.S. Cl.
    CPC ............ *F16K 31/008* (2013.01); *F16K 11/07* (2013.01)

(58) Field of Classification Search
    CPC .... F16K 31/008; F16K 31/007; F16K 31/124; F16K 11/07; F16K 11/0708; F16K 99/0028; F16K 99/0048; F16K 99/0059
See application file for complete search history.

(56) References Cited

U.S. PATENT DOCUMENTS

| 4,560,871 | A | * | 12/1985 | Bowman | F16K 31/00 250/288 |
| RE33,863 | E | * | 3/1992 | Bowman | F16K 31/007 250/288 |
| 6,279,872 | B1 | * | 8/2001 | Neuhaus | F02K 9/58 251/129.14 |
| 2002/0017833 | A1 | * | 2/2002 | Montuschi | F02M 63/0066 310/328 |
| 2007/0075286 | A1 | * | 4/2007 | Tanner | F16K 11/07 251/129.06 |
| 2009/0242813 | A1 | * | 10/2009 | Hirata | F16K 31/005 251/129.01 |
| 2019/0195381 | A1 | * | 6/2019 | Jaskiewicz | F15B 13/0435 |
| 2020/0063876 | A1 | * | 2/2020 | DeSalvo | F16K 11/0716 |

FOREIGN PATENT DOCUMENTS

DE    10 2012 013 594 A1    1/2014

* cited by examiner

*Primary Examiner* — Kelsey E Cary
(74) *Attorney, Agent, or Firm* — FisherBroyles, LLP

(57) ABSTRACT

The disclosed fluidic devices may include a valve chamber in a valve body, a fluid inlet into the valve chamber, a piston positioned within the valve chamber, a first fluid outlet for passing fluid out of the valve chamber when the piston is in a first position, a second fluid outlet for passing fluid out of the valve chamber when the piston is in a second position, a first piezoelectric actuator positioned and configured for moving the piston from the first position to the second position, and a second piezoelectric actuator positioned and configured for moving the piston from the second position to the first position. Various other methods, systems, and devices are also disclosed.

18 Claims, 17 Drawing Sheets

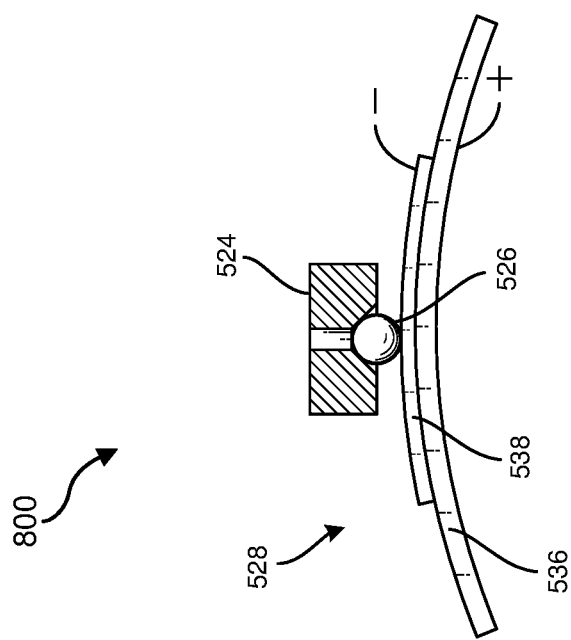
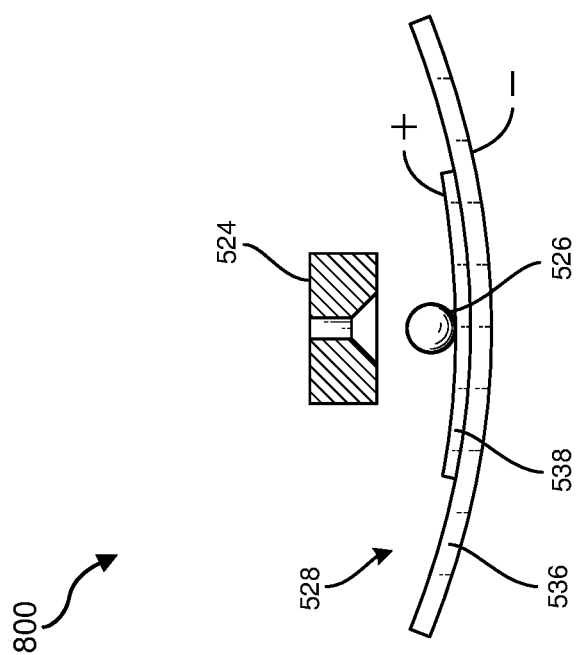

FLUIDIC DEVICES WITH PIEZOELECTRIC ACTUATORS AND RELATED METHODS

BRIEF DESCRIPTION OF THE DRAWINGS

The accompanying drawings illustrate a number of example embodiments and are a part of the specification. Together with the following description, these drawings demonstrate and explain various principles of the present disclosure.

FIG. 8A is a side view of a piezoelectric actuator assembly in an open position, according to at least one embodiment of the present disclosure.

FIG. 8B is a side view of the piezoelectric actuator assembly of FIG. 8A in a closed position.

Figure 1:
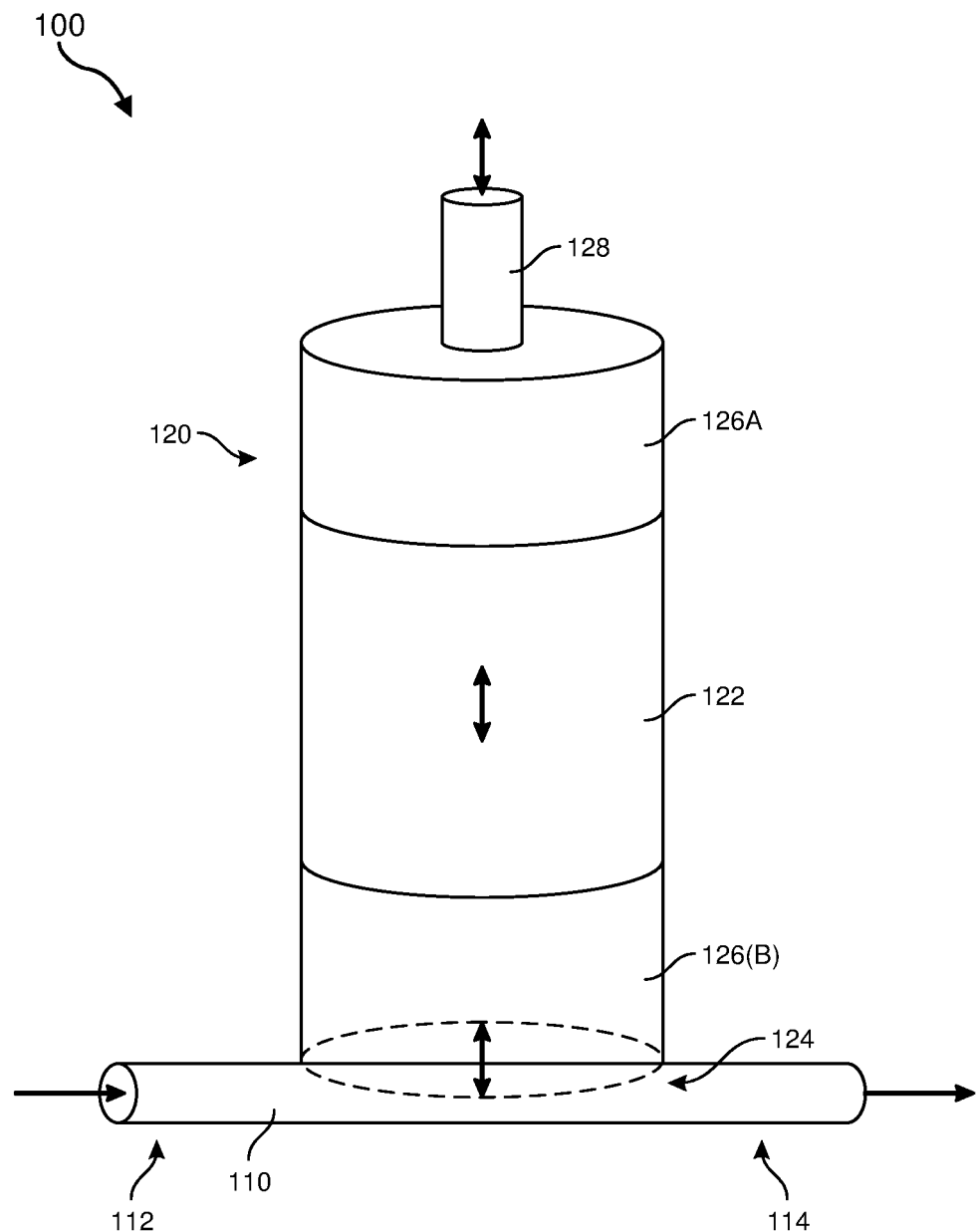
FIG. 1 is an illustration of an example fluidic control system that may be used in connection with embodiments of this disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

Microfluidic systems are small mechanical systems that involve the flow of fluids. Microfluidic systems can be used in many different fields, such as biomedical, chemical, genetic, biochemical, pharmaceutical, haptics, and other fields. A microfluidic valve is a basic component of a microfluidic system and may be used for stopping, starting, or otherwise controlling flow of a fluid in a microfluidic system. Conventional microfluidic valves may be actuated via fluid pressure, with a piezoelectric material, or a spring-loaded mechanism, for example.

Haptic feedback mechanisms are designed to provide a physical sensation (e.g., vibration, pressure, heat, etc.) as an indication to a user. For example, vibrotactile devices include devices that may vibrate to provide haptic feedback to a user of a device. For example, some modern mobile devices (e.g., cell phones, tablets, mobile gaming devices, gaming controllers, etc.) include a vibrotactile device that informs the user through a vibration that an action has been taken. The vibration may indicate to the user that a selection has been made or a touch event has been sensed. Vibrotactile devices may also be used to provide an alert or signal to the user. Haptic feedback may be employed in artificial-reality systems (e.g., virtual-reality systems, augmented-reality systems, mixed-reality systems, hybrid-reality systems), such as by providing one or more haptic feedback mechanisms in a controller or a glove or other wearable device.

Various types of vibrotactile devices exist, such as piezoelectric devices, eccentric rotating mass devices, and linear resonant actuators. Such conventional vibrotactile devices may include one or more elements that vibrate upon application of an electrical voltage. In the case of piezoelectric devices, an applied voltage may induce bending or other displacement in a piezoelectric material. Eccentric rotating mass devices induce vibration by rotating an off-center mass around an axle of an electromagnetic motor. Linear resonant actuators may include a mass on an end of a spring that is driven by a linear actuator to cause vibration.

The present disclosure is generally directed to fluidic devices, methods for directing a fluid, and methods of forming fluidic devices. As will be explained in greater detail below, embodiments of the present disclosure may include a fluidic device that includes a first piezoelectric actuator positioned and configured for moving a piston from a first position to a second position and a second piezoelectric actuator positioned and configured for moving the piston from the second position to a first position. Such fluidic devices may be used to provide haptic feedback to a user, among other potential applications. Fluidic devices according to the present disclosure may be able to function with low (compared to conventional fluidic devices) or no input energy to maintain the device in a first flow state (e.g., flow through a first fluid outlet or through a second fluid outlet), and may be able to quickly switch to a second flow state with low input energy. In addition, the fluidic devices according to the present disclosure are capable of implementation in a small form factor, such as in a wearable device (e.g., a glove, a wristband, etc.)

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 11:
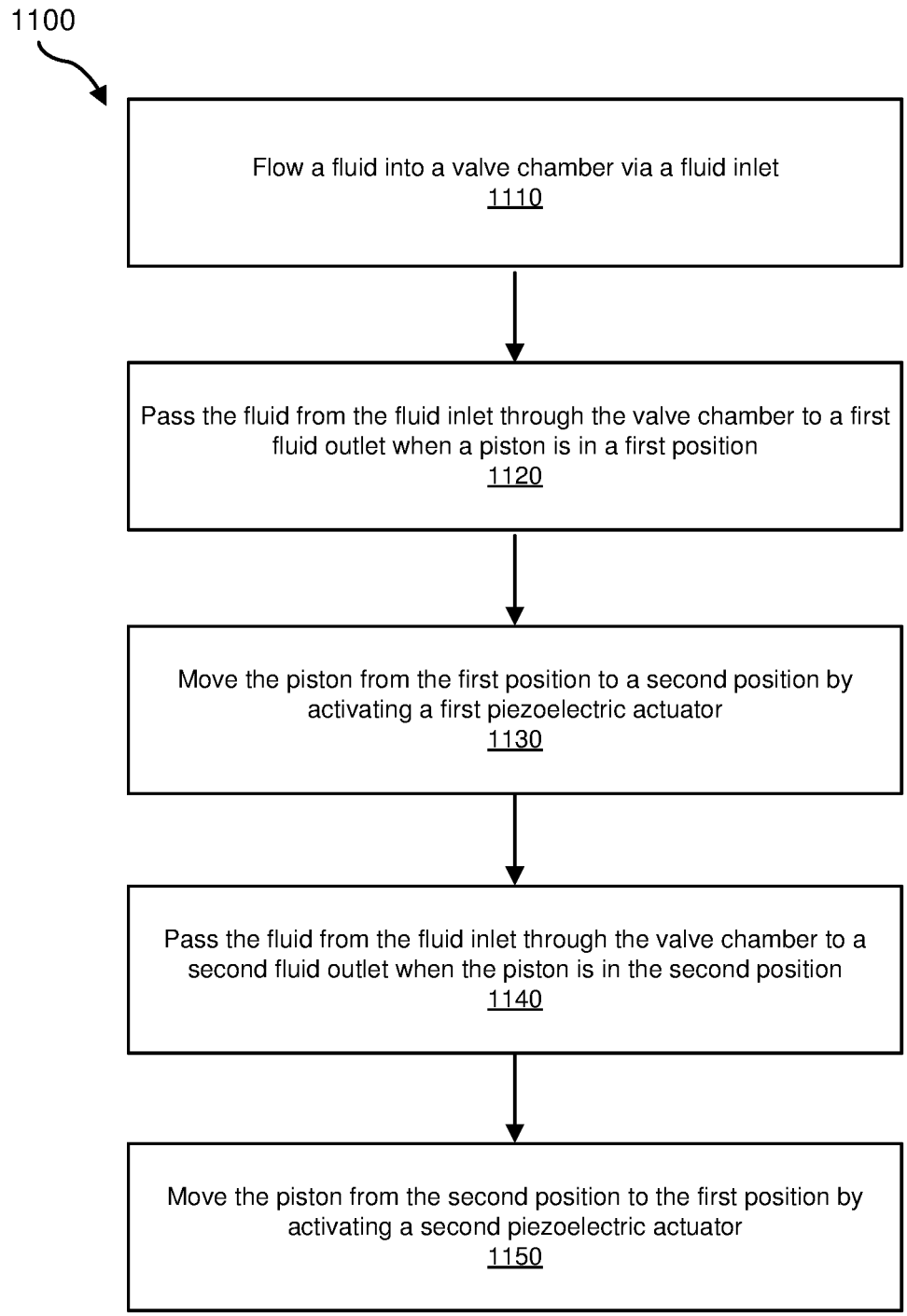
FIG. 11 is a flow diagram illustrating a method of directing fluid, according to at least one embodiment of the present disclosure.
Figure 12:
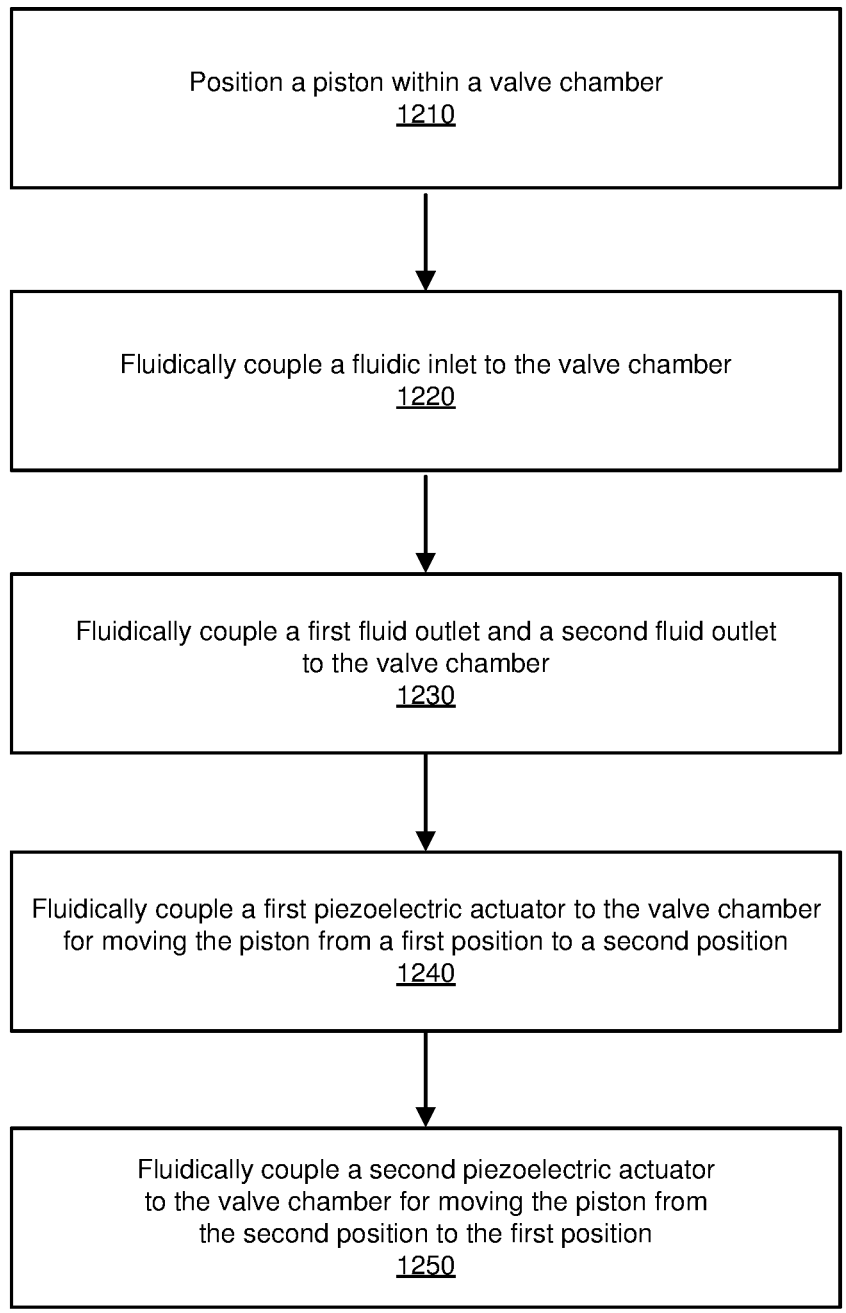
FIG. 12 is a flow diagram illustrating a method of forming a fluidic device, according to at least one embodiment of the present disclosure.

The following will provide, with reference to FIG. 1, detailed descriptions of an example fluidic control system that may be used in connection with embodiments of this disclosure. With reference to FIGS. 2A-10D, the following will provide detailed descriptions of various example fluidic devices, components thereof, and configurations thereof. With reference to FIG. 11, the following will provide detailed descriptions of a method of directing fluid. With reference to FIG. 12, the following will provide detailed descriptions of a method of forming a fluidic device. With reference to FIGS. 13-17, the following will provide detailed descriptions of various devices and systems that may be used in connection with embodiments of this disclosure.

The present disclosure may include haptic fluidic systems that involve the control (e.g., stopping, starting, restricting, increasing, etc.) of fluid flow through a fluid channel. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

Fluidic valve 100 may include a gate 120 for controlling the fluid flow through fluid channel 110. Gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to the gate transmission element 122 may result in opening the restricting region 124 to allow or increase flow through the fluid channel 110. The force, pressure, or displacement applied to the gate transmission element 122 may be referred to as a gate force, gate pressure, or gate displacement. The gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, the gate 120 of the fluidic valve 100 may include one or more gate terminals, such as an input gate terminal 126(A) and an output gate terminal 126(B) (collectively referred to herein as "gate terminals 126") on opposing sides of the gate transmission element 122. The gate terminals 126 may be elements for applying a force (e.g., pressure) to the gate transmission element 122. By way of example, the gate terminals 126 may each be or include a fluid chamber adjacent to the gate transmission element 122. Alternatively or additionally, one or more of the gate terminals 126 may include a solid component, such as a lever, screw, or piston, that is configured to apply a force to the gate transmission element 122.

In some examples, a gate port 128 may be in fluid communication with the input gate terminal 126(A) for applying a positive or negative fluid pressure within the input gate terminal 126(A). A control fluid source (e.g., a pressurized fluid source, a fluid pump, etc.) may be in fluid communication with the gate port 128 to selectively pressurize and/or depressurize the input gate terminal 126(A). In additional embodiments, a force or pressure may be applied at the input gate terminal 126(A) in other ways, such as with a piezoelectric element or an electromechanical actuator, etc.

Figure 2A:
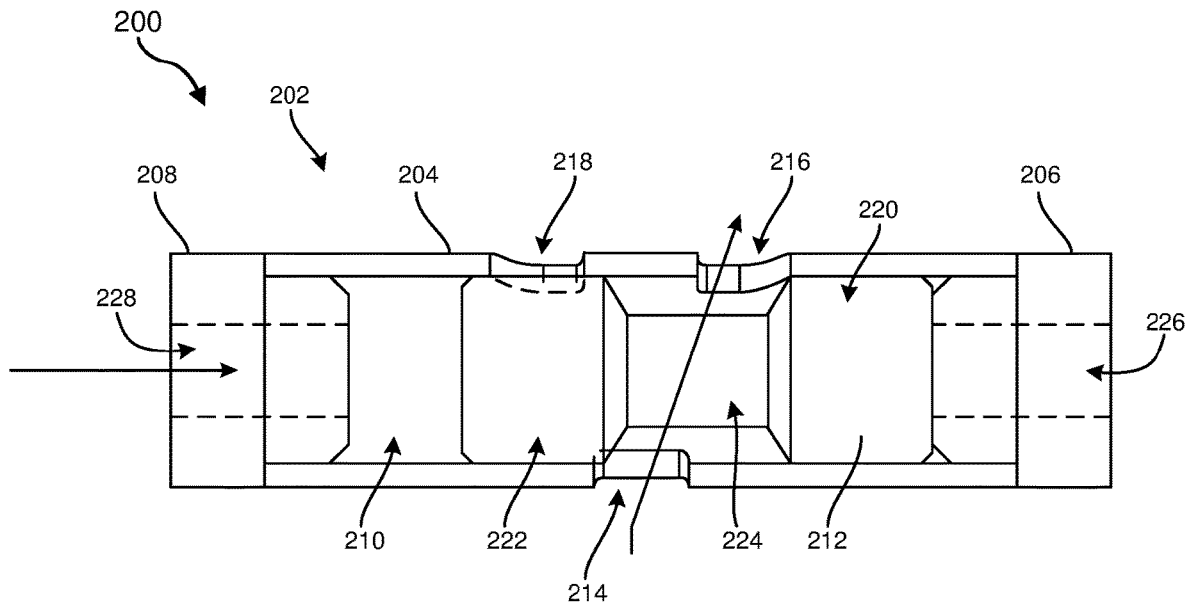
FIGS. 2A and 2B are cross-sectional side views of a fluidic device that may be used as a fluidic switch or a fluidic oscillator, according to at least one embodiment of the present disclosure.
Figure 2B:
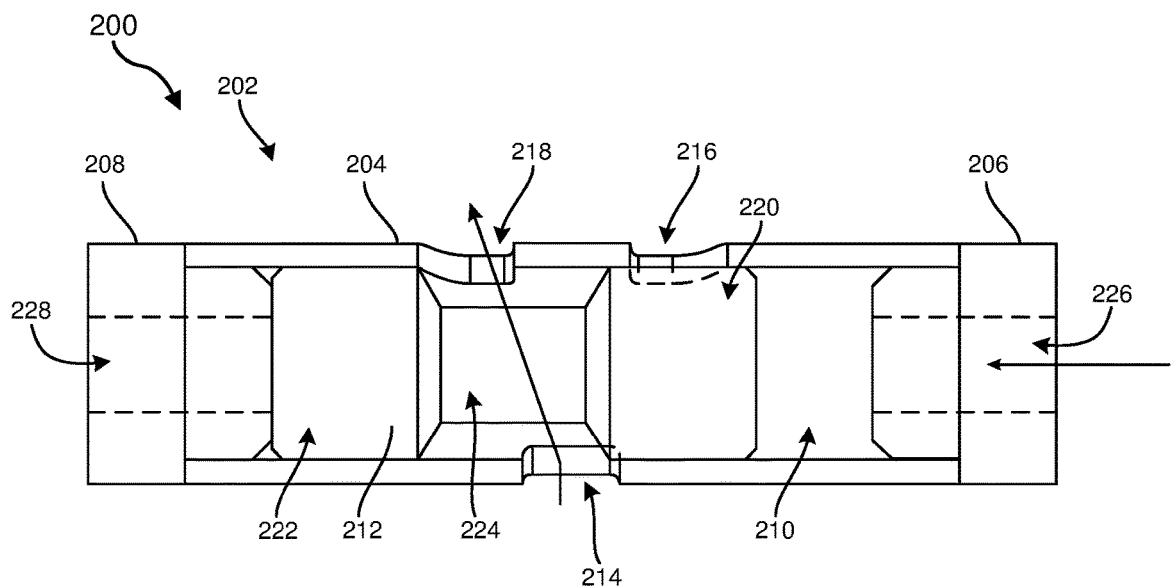

FIGS. 2A and 2B are cross-sectional side views of a fluidic device 200. By way of example and not limitation, the fluidic device 200 may be used as a fluidic oscillator and/or as a fluidic switch. The fluidic device 200 may include a valve body 202 that defined at least in part by a cylinder 204, a first endcap 206, and a second endcap 208. A valve chamber 210 may be defined by an interior of the cylinder 204 and between the endcaps 206, 208. A movable piston 212, which may be movable between a first position (e.g., shown in FIG. 2A) and a second position (e.g., shown in FIG. 2B), may be positioned anywhere within the valve chamber 210.

A fluid inlet 214 (e.g., a hole through the cylinder 204) may be in fluid communication with the valve chamber 210. A first fluid outlet 216 and a second fluid outlet 218 (e.g., holes through the cylinder 204) may also be in fluid communication with the valve chamber 210. Depending on the position of the movable piston 212 within the valve chamber 210, the fluidic device 200 may enable the flow of fluid (e.g., a liquid or a gas) into the fluid inlet 214, through the valve chamber 210, and out of the first fluid outlet 216, the second fluid outlet 218, or any ratio of both the first fluid outlet 216 and the second fluid outlet 218.

As illustrated in FIGS. 2A and 2B, the movable piston 212 may, in some examples, have a dumbbell shape, with a first enlarged end portion 220, a second enlarged end portion 222, and a central shaft 224 extending between the enlarged end portions 220, 222. The enlarged end portions 220, 222 may be sized and configured for sliding along an interior surface of the cylinder 204 within the valve chamber 210. The central shaft 224 may, in some examples, be smaller in diameter than the enlarged end portions 220, 222, such that a fluid may be able to flow around the central shaft 224 to one or both of the fluid outlets 216, 218, depending on the position of the movable piston 212. In additional embodiments, rather than or in addition to including the central shaft 224, one or more channels may extend through the movable piston 212 to provide a fluid pathway between the fluid inlet 214 and the fluid outlet(s) 216, 218.

The first endcap 206 may include a first piston actuation inlet 226, which may be a hole passing through the first endcap 206. Likewise, the second endcap 208 may include a second piston actuation inlet 228, which may be a hole passing through the second endcap 208. When a fluid pressure is applied to the movable piston 212 through the first piston actuation inlet 226, the movable piston 212 may move from the first position (shown in FIG. 2A) to the second position (shown in FIG. 2B). Similarly, when a fluid pressure is applied to the movable piston 212 through the second piston actuation inlet 228, the movable piston 212 may move from the second position to the first position.

When the movable piston 212 is in the first position (FIG. 2A), fluid may be able to flow from the fluid inlet 214 to the first fluid outlet 216, and the second fluid outlet 218 may be blocked by the movable piston 212 (e.g., by the second enlarged end portion 222). When the movable piston 212 is in the second position (FIG. 2B), fluid may be able to flow from the fluid inlet 214 to the second fluid outlet 218, and the first fluid outlet 216 may be blocked by the movable piston 212 (e.g., by the first enlarged end portion 220). If there is no pressure differential between the first piston actuation inlet 226 and the second piston actuation inlet 228, the movable piston 212 may remain in its position (e.g., the first position, the second position, or any intermediate position between the first and second positions). For example, the fluid flowing from the fluid inlet 214 to the first fluid outlet 216 or to the second fluid outlet 218 may act on the movable piston 212 in substantially equal and opposite (e.g., in the left and right directions of FIGS. 2A and 2B) magnitudes. Accordingly, in the absence of an applied pressure through the first piston actuation inlet 226 and/or the second piston actuation inlet 228, the movable piston 212 may remain in a fixed position within the valve chamber 210. Thus, in some embodiments, the fluidic device 200 may be configured and operated as a fluidic switch that may require no standing power (e.g., pressure, electrical power, etc.) to remain in a desired state (e.g., inducing flow to the first fluid outlet 216, to the second fluid outlet 218, or split between the first and second fluid outlets 216, 218).

Although the fluidic device 200 is scalable for different applications, in some embodiments, an internal diameter of the fluid inlet 214 may be about 2 mm or less. For example, the fluidic device 200 may be sufficiently small for incorporation in a fluidic system of a haptic device, such as a haptic glove. In addition, forming the fluidic device 200 to have a fluid inlet 214 with an internal diameter of about 2 mm or less may reduce a power input required to flow fluid through the fluidic device 200, compared to larger internal diameters.

Figure 3A:
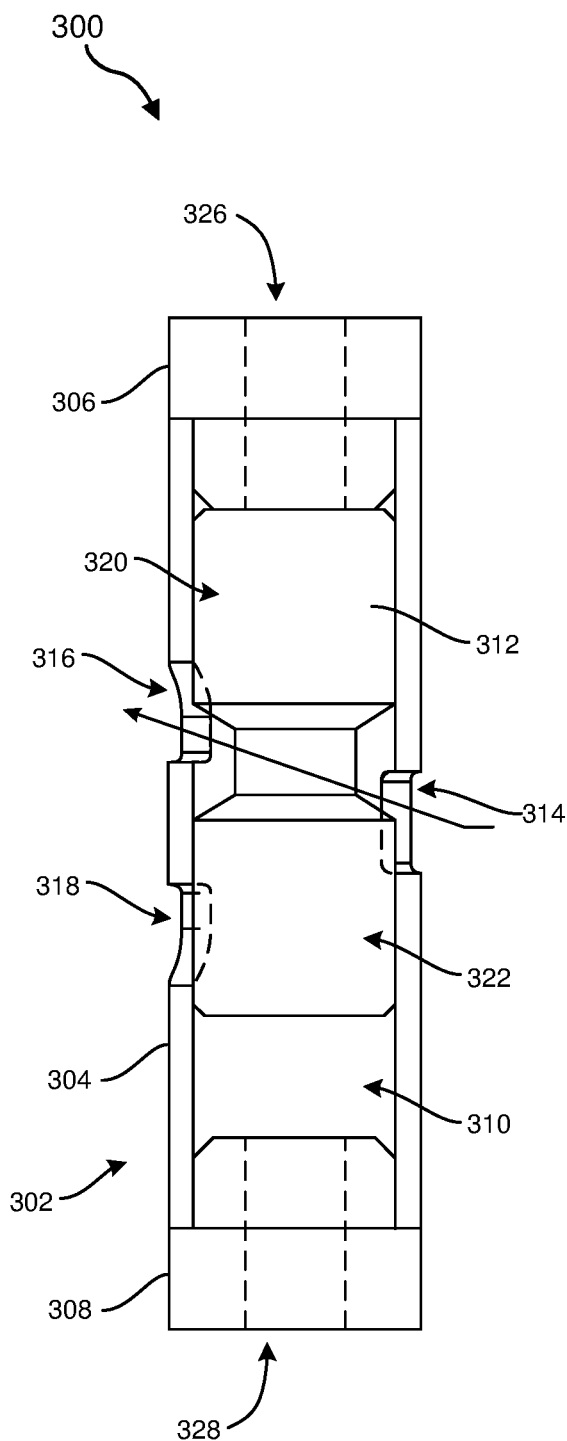
FIGS. 3A and 3B are cross-sectional side views of a fluidic device, according to at least one additional embodiment of the present disclosure.
Figure 3B:
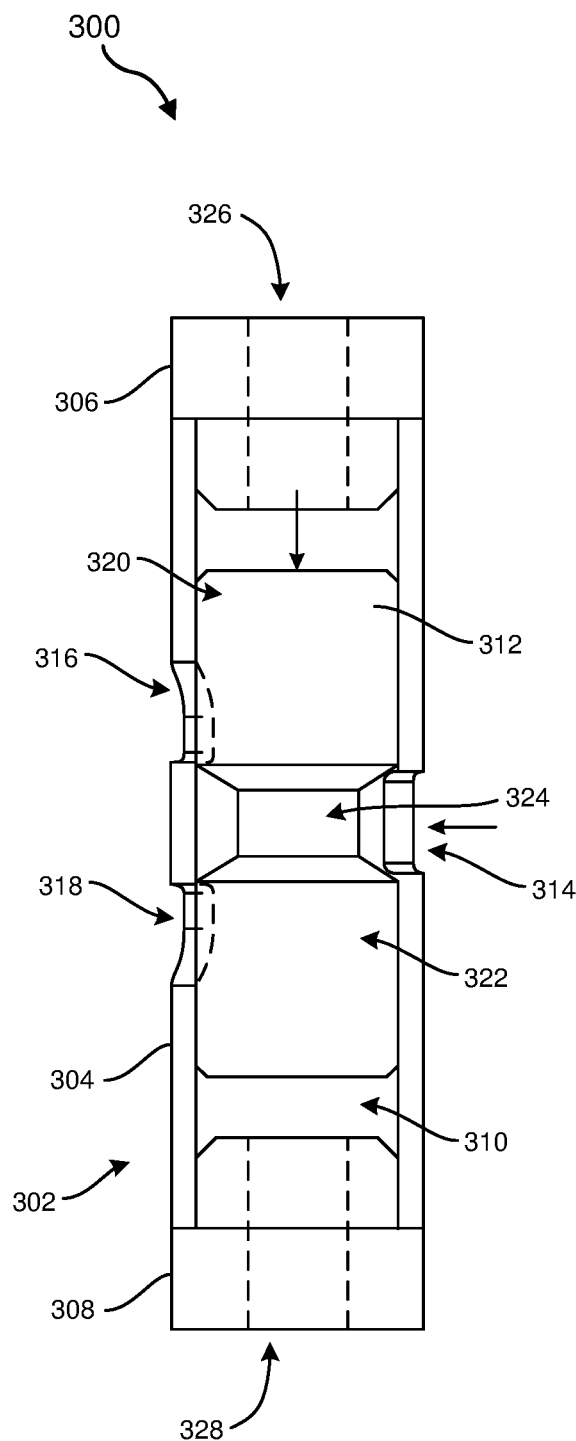

FIGS. 3A and 3B are side cross-sectional views of a fluidic device 300 according to additional embodiments of the present disclosure. The fluidic device 300 may be similar to the fluidic device 200 described above with reference to FIGS. 2A and 2B. For example, the fluidic device 300 may include a valve body 302, which may include a cylinder 304, a first endcap 306, and a second endcap 308. A valve chamber 310 may be defined inside the valve body 302. A movable piston 312 may be movably positioned within the valve chamber 310. The valve chamber 310 may be in fluid communication with a fluid inlet 314, a first fluid outlet 316, a second fluid outlet 318, a first piston actuation inlet 326, and a second piston actuation inlet 328.

The movable piston 312 may, in some examples, have a dumbbell shape, with a first enlarged end portion 320, a second enlarged end portion 322, and a central shaft 324 extending between the enlarged end portions 320, 322. The enlarged end portions 320, 322 may be sized and configured for sliding along an interior surface of the cylinder 304 within the valve chamber 310. The central shaft 324 may, in some examples, be smaller in diameter than the enlarged end portions 320, 322, such that a fluid may be able to flow around the central shaft 324 to one of the fluid outlets 316, 318, depending on the position of the movable piston 312. In this example, the central shaft 324 may be shortened such that flow from the fluid inlet 314 may be blocked from flowing to either of the fluid outlets 316, 318 when the movable piston 312 is in at least one intermediate position between a first position in which fluid may flow to the first fluid outlet 316 and a second position in which fluid may flow to the second fluid outlet 318.

For example, FIG. 3A illustrates the movable piston 312 in the first position in which fluid may be able to flow from the fluid inlet 314 to the first fluid outlet 316, similar to FIG. 2A above. On the other hand, FIG. 3B illustrates the movable piston 312 in an intermediate position in which fluid is blocked from flowing from the fluid inlet 314 to either of the first fluid outlet 316 or the second fluid outlet 318. In this intermediate position, the first enlarged end portion 320 of the movable piston 312 may block the first fluid outlet 316 and the second enlarged end portion 322 may block the second fluid outlet 318. Since fluid entering the valve chamber 310 through the fluid inlet 314 has no available outlet, the fluidic device 300 may stop fluid flow when the movable piston 312 is in this intermediate position shown in FIG. 3B. In some examples, the movable piston 312 may be able to remain in the intermediate position to stop fluid flow through the fluidic device 300 with no required standing power (e.g., pressure).

The fluidic device 300 of FIGS. 3A and 3B has been described as including a movable piston 312 with a shortened central shaft 324 (e.g., compared to the central shaft 224 of the fluidic device 200 described with reference to FIGS. 2A and 2B). However, the present disclosure is not so limited. Alternatively or additionally, the first and second fluid outlets 316, 318 may be positioned farther from each other (e.g., compared to the embodiment shown in FIGS. 2A and 2B) to provide a greater portion of the cylinder 304 between the fluid outlets 316, 318. In this example, the central shaft 324 may, in some embodiments, not be shortened relative to the embodiment shown in FIGS. 2A and 2B and the resulting movable piston 312 may still have an intermediate position in which the fluid flow is stopped, as described above with reference to FIG. 3B. In further examples, one or both of the fluid outlets 316, 318 may have a different shape and/or size, such as to induce a different pressure or flow profile when the fluidic device 300 is in operation.

Figure 4:
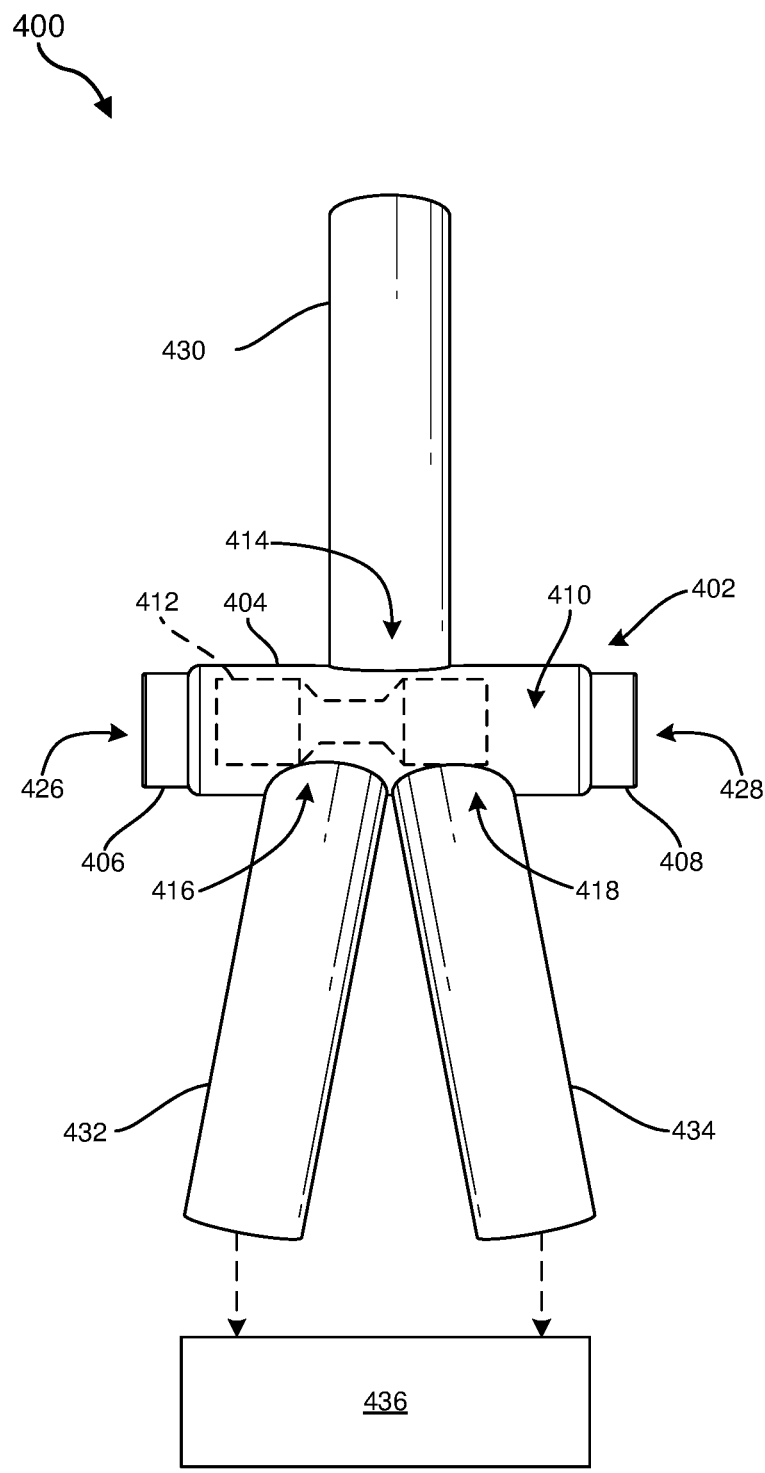
FIG. 4 is a side view of a fluidic device that may be used as a fluidic switch or a fluidic oscillator, according to at least one embodiment of the present disclosure.

FIG. 4 is a side view of a fluidic device 400. The fluidic device 400 may be similar to the fluidic device 200 or 300 described above with reference to FIGS. 2A and 2B or FIGS. 3A and 3B. For example, the fluidic device 400 may include a valve body 402, which may include a cylinder 404, a first endcap 406, and a second endcap 408. A valve chamber 410 may be defined inside the valve body 402. A movable piston 412 may be movably positioned within the valve chamber 410. The valve chamber 410 may be in fluid communication with a fluid inlet 414, a first fluid outlet 416, a second fluid outlet 418, a first piston actuation inlet 426, and a second piston actuation inlet 428.

As shown in FIG. 4, an inlet extension 430 may be operably coupled to the fluid inlet 414, a first outlet extension 432 may be operably coupled to the first fluid outlet 416, and a second outlet extension 434 may be operably coupled to the second fluid outlet 418. The extensions 430, 432, 434 may, for example, be brazed, welded, adhered, interference-fit, press-fit, snap-fit, screwed, or otherwise coupled to the respective inlet 414 or outlet 416, 418. The extensions 430, 432, 434 may be included, shaped, sized, and configured to facilitate coupling conduits (e.g., flexible conduits, piping, fluid channels, etc.) to the fluidic device 400. The piston actuation inlets 426, 428 may also be shaped, sized, and configured to facilitate coupling other conduits to the fluidic device for applying a pressure to move the movable piston 412 within the valve chamber 410. A fluid-driven device 436 may be fluidically coupled to one or both of the outlets 416, 418, such as via the extensions 432, 434 and/or additional conduit. By way of example and not limitation, the fluid-driven device 436 may include a haptic feedback device, a piston device, an inflatable bladder, a fan or other rotatable element, etc.

Figure 5:
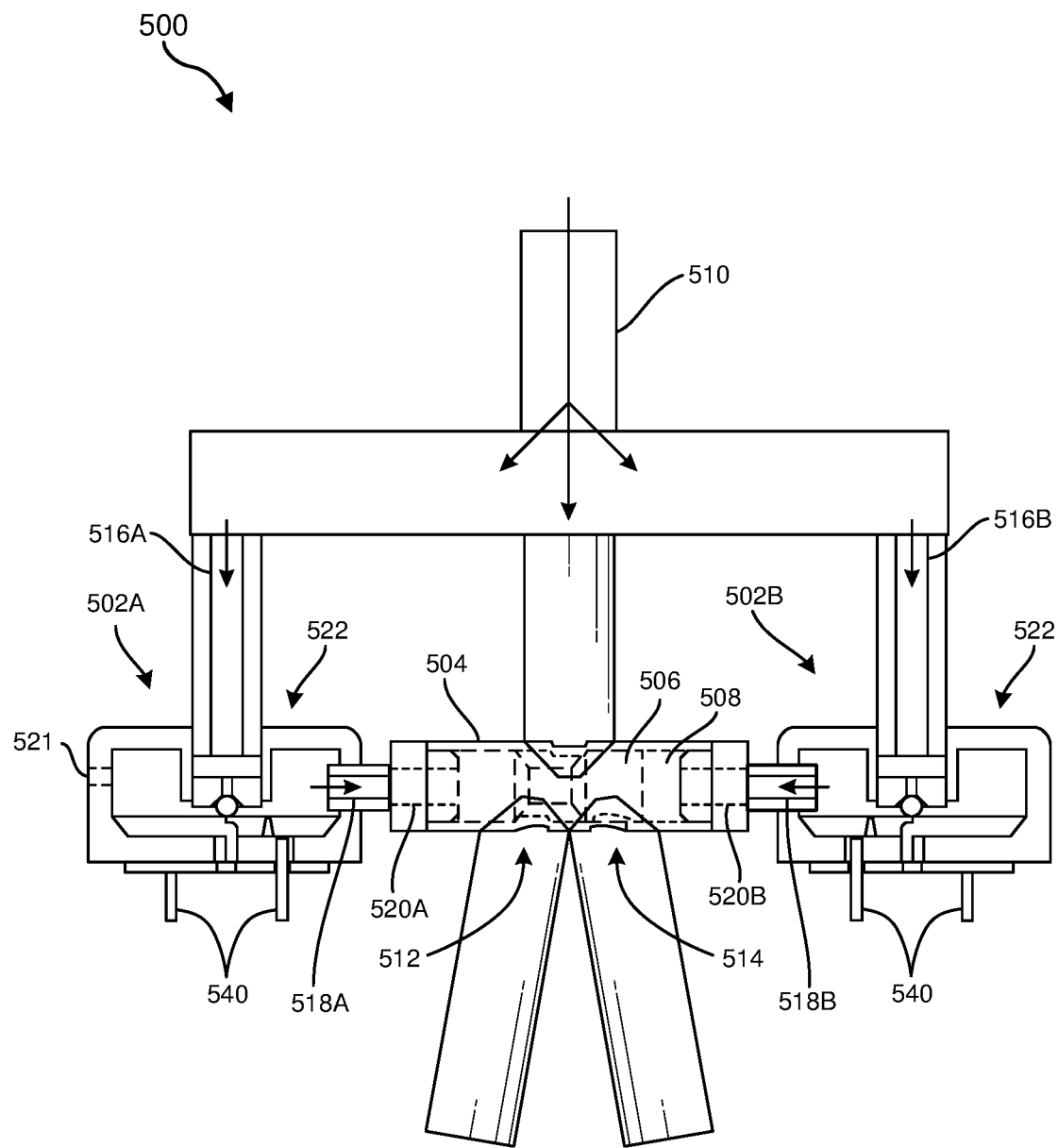
FIG. 5 is a side view of a fluidic device including piezoelectric actuators, according to at least one embodiment of the present disclosure.

FIG. 5 is a side view of a fluidic device 500 including a first piezoelectric actuator 502A and a second piezoelectric actuator 502B, according to at least one embodiment of the present disclosure. The first and second piezoelectric actuators 502A, 502B are collectively referred to as "piezoelectric actuators 502." The piezoelectric actuators 502 may be operatively coupled to a valve body 504 to move a piston 506 within a valve chamber 508 of the valve body 504. The valve body 504, piston 506, and valve chamber 508 may be the same as or similar to the valve bodies, pistons, and valve chambers discussed above. For example, a fluid inlet 510 may be in fluid communication with the valve chamber 508 for flowing fluid into the valve chamber 508. A first fluid outlet 512 and a second fluid outlet 514 may also be in fluid communication with the valve chamber 508 for flowing the fluid out of the valve chamber 508. When the piston 506 is in a first position (as illustrated in FIG. 5), the fluid may flow out of the valve chamber 508 through the first fluid outlet 512, and when the piston 506 is in a second position, the fluid may flow out of the valve chamber 508 through the second fluid outlet 512. In some examples, the piston 506 may be located in an intermediate position between the first position and the second position. Depending on a configuration of the piston 506 (e.g., a distance between enlarged end portions thereof), fluid may flow through both of the fluid outlets 512, 514 in any ratio, or fluid may flow through only one of the fluid outlets 512, 514 at a time. In some embodiments, the fluidic device 500 may be operable as a fluidic switch or a fluidic oscillator.

As illustrated in FIG. 5, the piezoelectric actuators 502 may include respective actuator inlets 516A, 516B (collectively referred to as "actuator inlets 516") and actuator outlets 518A, 518B (collectively referred to as "actuator outlets 518"). The actuator inlets 516 may each be in fluid communication with the fluid inlet 510 for receiving fluid from the fluid inlet 510. The actuator outlets 518 may each be in fluid communication with the valve chamber 508 on opposing sides of the piston 506 via piston actuation inlets 520A, 520B (collectively referred to as piston actuation inlets 520), respectively, for moving the piston 506 between the first position and the second position.

Figure 6:
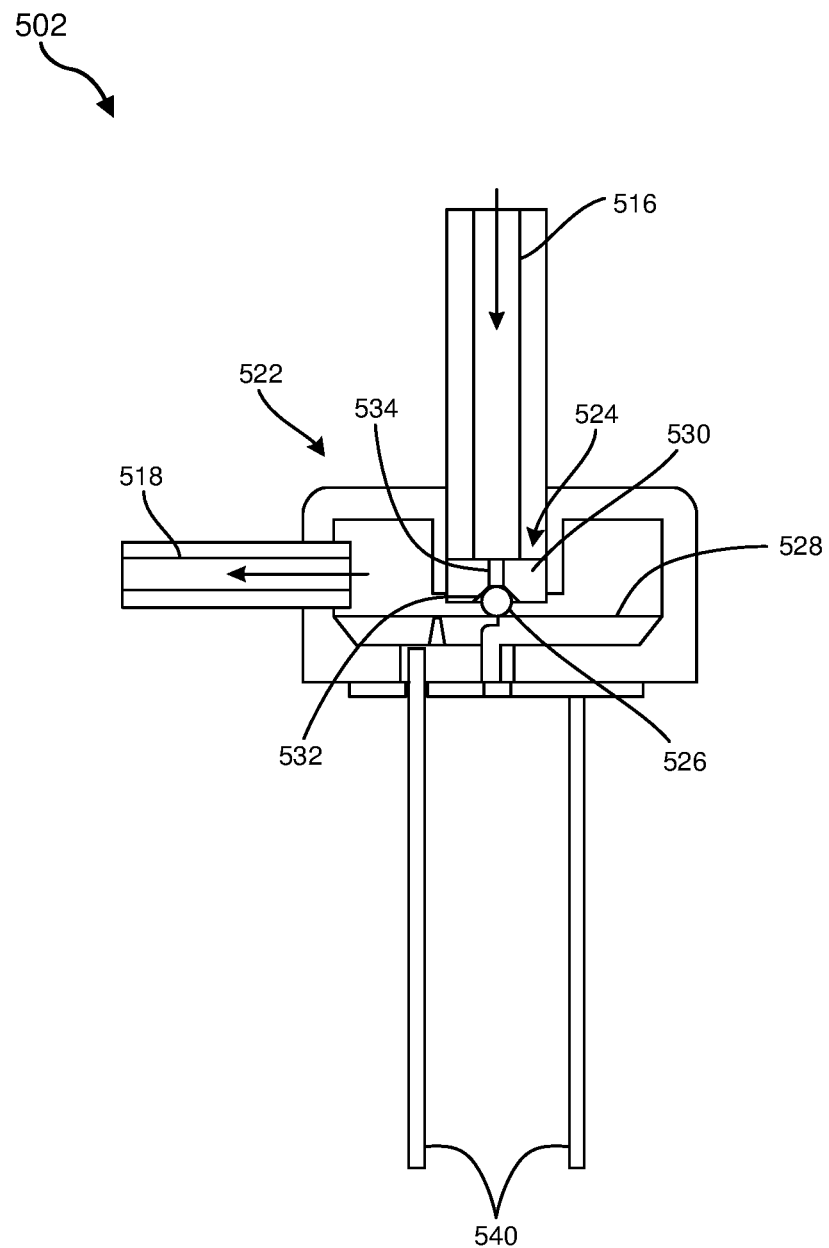
FIG. 6 is a detailed side view of a piezoelectric actuator, according to at least one embodiment of the present disclosure.

Each of the piezoelectric actuators 502 may include a piezoelectric valve 522 for selectively flowing fluid from the actuator inlet 516 to the actuator outlet 518. FIG. 6 is a detailed side view of one of the piezoelectric actuators 502, according to at least one embodiment of the present disclosure. As shown in FIG. 6, the piezoelectric valve 522 may include a valve seat 524, a valve bearing 526, and a piezoelectric stack 528 of materials for moving the valve bearing 526 between a closed position (as illustrated in FIG. 6) abutting against the valve seat 524 and an open position away from the valve seat 524. When the valve bearing 526 is in the closed position, flow of fluid from the actuator inlet 516 to the actuator outlet 518 may be inhibited (e.g., reduced or stopped). When the valve bearing 526 is in the open position, flow of fluid from the actuator inlet 516 to the actuator outlet 518 may be allowed.

Referring again to FIG. 5, in some embodiments, optionally, a pressure relief feature 521 (e.g., a calibrated hole) may be present and configured to release pressure within the piezoelectric valve 522 after actuation, such as to enable the piston 506 to be moved back into an original position. For example, when the piston 506 is moved from the first position to the second position responsive to the first piezoelectric actuator 502A being actuated and then closed, fluid within the piezoelectric valve 522 may inhibit the piston 506 from moving back from the second position to the first position since the fluid has a substantially fixed volume when the first piezoelectric actuator 502A is closed. Accordingly, the pressure relief feature 521 may allow pressurized fluid to escape and the piston 506 to move as desired. The pressure relief feature 521 may be positioned in or on the piezoelectric valve 522, the valve body 504, a conduit passing between the piezoelectric valve 522 and the valve body 504, or in any other location in fluid communication with a volume within the piezoelectric valve 522.

Figure 7A:
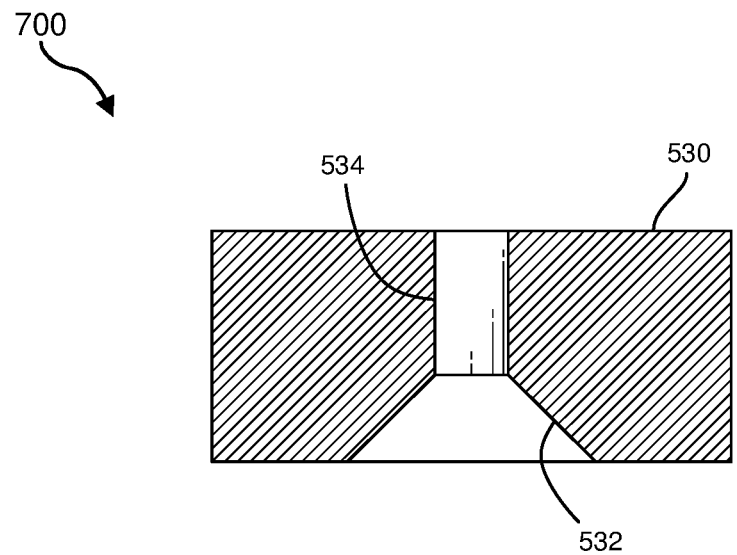
FIG. 7A is a side cross-sectional view of a valve seat, according to at least one embodiment of the present disclosure.
Figure 7B:
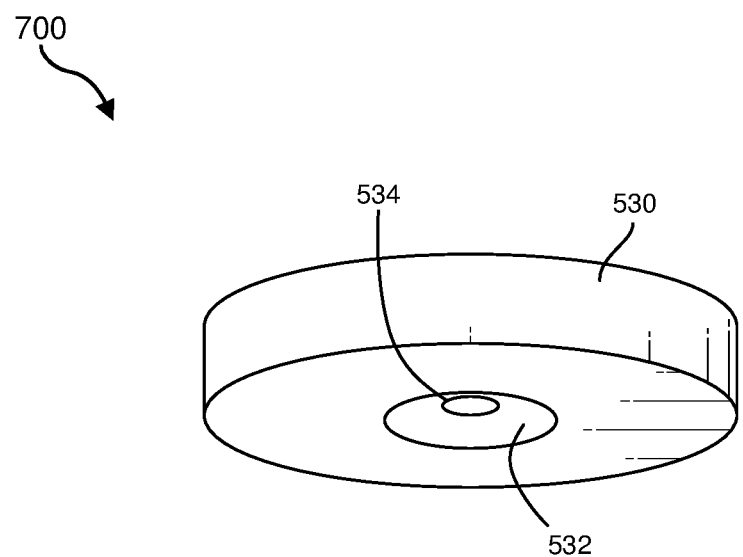
FIG. 7B is a bottom perspective view of the valve seat of FIG. 7A.

FIGS. 7A and 7B show two views of the valve seat 524, according to at least one embodiment of the present disclosure. As shown in FIGS. 6, 7A, and 7B, the valve seat 524 may include a valve seat body 530, which may be generally cylindrical in shape. The valve seat body 530 may include a concave conical bearing surface 532 sized and shaped for abutment by the valve bearing 526 (FIG. 6). A cylindrical hole 534 may pass through the valve seat body 530 from one surface thereof to the concave conical bearing surface 532. The cylindrical hole 534 may be sized and shaped to be covered and blocked by the valve bearing 526 when the valve bearing 526 is in a closed position abutting against the concave conical bearing surface 532. The cylindrical hole 534 may have a smaller diameter than the valve bearing 526.

Although the valve seat body 530 is illustrated in a generally cylindrical form, the present disclosure is not so limited. For example, in additional embodiments the valve seat body 530 may have a rectangular prism shape, a triangular prism shape, an oval prism shape, or an irregular prism shape. In addition, the concave conical bearing surface 532 may have a shape other than conical, such as curved or stepped. In some embodiments, the concave conical bearing surface 532 may be omitted, and the cylindrical hole 534 may pass all the way through the valve seat body 530 between opposing surfaces thereof. The cylindrical hole 534 may also have a shape other than cylindrical, such as conical, curved, or stepped.

The valve seat body 530 may include or be formed of a material that can mechanically withstand repeated abutments by the valve bearing 526. By way of example and not limitation, the valve seat body 530 may be or include a ceramic material, a metal material, a polymeric material, or a composite material, such as an aluminum oxide material (e.g., sapphire, ruby), a steel material, a brass material, a bronze material, a titanium material, a titanium oxide material, a nylon material, a polyethylene material, a polyvinyl chloride material, an acrylate material, a polycarbonate material, etc.

The valve bearing 526 may be shaped and configured for abutting against the valve seat 524 for substantially stopping flow of fluid from the actuator inlet 516 to the actuator outlet 518 when in a closed position. As illustrated in FIGS. 5 and 6, the valve bearing 526 may be substantially spherical in some examples. Other shapes for the valve bearing 526 are illustrated in FIGS. 10A-10D by way of example, although additional shapes may also be suitable. The valve bearing 526 may be or include a material that can mechanically withstand repeated abutments against the valve seat 524 and a flow of fluid past the valve bearing 526 when the valve bearing 526 is moved to an open position. For example, the valve bearing 526 may be or include a ceramic material, a metal material, a polymeric material, or a composite material.

The piezoelectric stack 528 of materials may be configured to move the valve bearing 526 between the closed and open positions. FIGS. 8A and 8B illustrate side views of a piezoelectric actuator assembly 800 in an open position and in a closed position, respectively. The piezoelectric actuator assembly 800 may be a part of the piezoelectric valve 522, for example. As illustrated in FIGS. 8A and 8B, the piezoelectric stack 528 of materials may include a first material 536 and a second material 538 positioned over (e.g., coupled to) the first material 536. At least one of the materials 536, 538 (or the combination of the materials 536, 538) may be piezoelectric (e.g., may include a material or combination of materials that is mechanically responsive to application of an electrical voltage). Thus, the materials 536, 538 may be in a so-called "bimorph" configuration. The valve bearing 526 may be coupled to (e.g., adhered to, welded to, mechanically secured to, etc.) the second material 538 in a position to be aligned with the valve seat 524. At least one of the materials 536, 538 may include, for example, a lead zirconate titanate ("PZT") material, a barium titanate material, a lead titanate material, a potassium niobate material, a lithium niobate material, a lithium tantalate material, a sodium tungstate material, a sodium potassium niobate material, a bismuth ferrite material, a sodium niobate material, a lead magnesium niobate-lead titanate ("PMN-PT") material, a polyvinylidene fluoride material, and/or another piezoelectric material. The other of the materials 536, 538 may include another piezoelectric material (e.g., a piezoelectric material polarized in an opposite direction), a metal material, a polymeric material, or a composite material.

As shown in FIG. 8A, when a sufficient voltage with a first polarity is applied to the piezoelectric stack 528 of materials 536, 538, the valve bearing 526 may be in an open position unseated from the valve seat 524, which may enable fluid to flow through the valve seat 524. For example, the first polarity may include applying a negative voltage to the first material 536 and a positive voltage to the second material 538, as illustrated in FIG. 8A. When a sufficient voltage with a second, opposite polarity is applied to the piezoelectric stack 528 of materials 536, 538, the valve bearing 526 may be in a closed position abutting the valve seat 524, which may stop fluid flow through the valve seat 524. For example, the second polarity may include applying a positive voltage to the first material 536 and a negative voltage to the second material 538, as illustrated in FIG. 8A. The applied voltages may result in the piezoelectric stack 528 of materials 536, 538 bending to move the valve bearing 526 between the open and closed positions.

In some embodiments, the piezoelectric stack 528 of materials 536, 538 may be positioned and configured to maintain the valve bearing 526 in either the closed position or the open position when no voltage or an insufficient voltage is applied to the piezoelectric stack 528. For example, the piezoelectric stack 528 may be positioned relative to the valve seat 524 such that the valve bearing 526 abuts against the valve seat 524 when no voltage or an insufficient voltage is applied to the piezoelectric stack 528. In some examples, the piezoelectric stack 528 may be mechanically preloaded such that the valve bearing 526 presses against the valve seat 524 with a force to block flow through the valve seat 524. For example, a resilience of the piezoelectric stack 528 and/or a biasing element (e.g., a spring) may be used to force the valve bearing 526 against the valve seat 524. In additional embodiments, the piezoelectric stack 528 and valve bearing 526 may be configured and positioned to be in an open position when no voltage or an insufficient voltage is applied to the piezoelectric stack 528.

Referring again to FIGS. 5 and 6, the piezoelectric valves 522 may include actuator leads 540 for applying an electrical voltage to the piezoelectric stack 528 of materials 536, 538. One of the actuator leads 540 may be electrically connected to the first material 536 and the other actuator lead 540 may be electrically connected to the second material 538. The application of a sufficient voltage may move the corresponding piezoelectric valve 522 to an open state or a closed state, depending on the polarity of the voltage. When one of the piezoelectric valves 522 is in an open state, fluid may flow from the corresponding actuator inlet 516 to the actuator outlet 518 and into the respective piston actuation inlet 520, which may force the piston 506 of the fluidic device 500 to move between its first and second positions. When it is desired to move the piston 506 into an opposite position (e.g., to flow fluid through the valve chamber 508 to a different one of the fluid outlets 512, 514), a voltage may be applied to the other of the piezoelectric valves 522 to flow fluid from the corresponding actuator inlet 516 to the actuator outlet 518 and into the respective piston actuation inlet 520, which may force the piston 506 in an opposite direction.

Figure 9A:
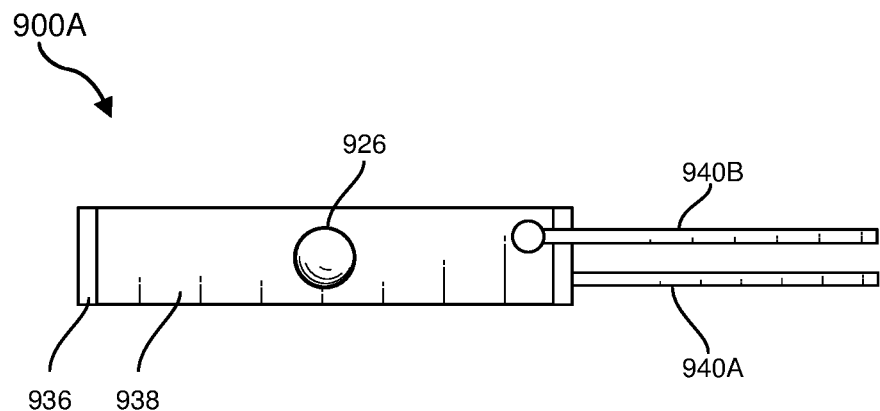
FIG. 9A is a top view of a piezoelectric element, according to at least one embodiment of the present disclosure.
Figure 9B:
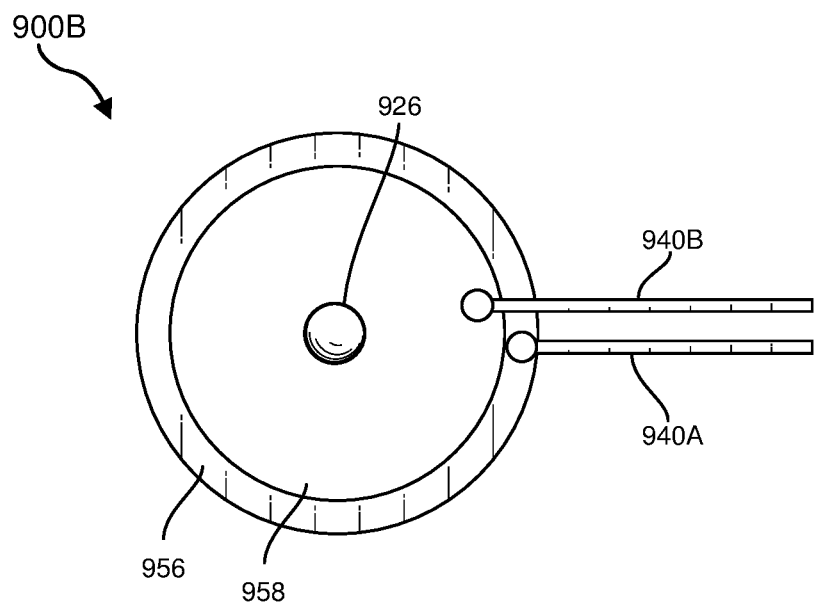
FIG. 9B is a top view of a piezoelectric element, according to at least one additional embodiment of the present disclosure.

The piezoelectric stack 528 of materials 536 may have a variety of configurations. FIGS. 9A and 9B illustrate two example configurations of piezoelectric elements 900A, 900B that could be used for the piezoelectric stack 528. FIG. 9A is a top view of the piezoelectric element 900A, according to at least one embodiment of the present disclosure. FIG. 9B is a top view of the piezoelectric element 900B, according to at least one additional embodiment of the present disclosure.

As shown in FIG. 9A, the piezoelectric element 900A may include a first material 936 and a second material 938 that have rectangular shapes. By way of example, the materials 936, 938 may have an elongated rectangular shape. At least one of the materials 936, 938 (or the combination of the materials 936, 938) may be piezoelectric. The second material 938 may be positioned over and coupled to the first material 936 in a bimorph configuration. A first actuator electrode 940A may be electrically connected (e.g., via solder) to the first material 936 and a second actuator electrode 940B may be electrically connected (e.g., via solder) to the second material 938. The first and second actuator electrodes 940A, 940B are collectively referred to as "actuator electrodes 940." The actuator electrodes 940 may be configured to provide electrical access to the materials 936, 938 for inducing bending in the materials 936, 938. Opposing ends of the materials 936, 938 may be secured to a support.

The piezoelectric element 900A may also include a valve bearing 926 coupled to (e.g., adhered to, welded to, etc.) the second material 936. By way of example and not limitation, the valve bearing 926 may be positioned at or near a geometric center of the second material 936. Thus, when the materials 936, 938 bend as a result of an applied voltage, the valve bearing 926 may move in a direction normal to the surface of the second material 938.

As shown in FIG. 9B, the piezoelectric element 900B may include a first material 956 and a second material 958 that have circular shapes. In some examples, the piezoelectric element 900B may be or may be similar to a piezoelectric buzzer element. The second material 958 may be positioned over and coupled to the first material 956 in a bimorph configuration. In some examples, the second material 958 may be smaller than (e.g., have a smaller diameter than) the first material 956, although other examples include second materials 958 that are substantially the same size as or larger than the first material 956. A first actuator electrode 940A may be electrically connected (e.g., via solder or via a conductive support material) to the first material 956 and a second actuator electrode 940B may be electrically connected (e.g., via solder or via a conductive support material) to the second material 958. The actuator electrodes 940 may be configured to provide electrical access to the materials 956, 958 for inducing bending in the materials 956, 958. At outer periphery of the materials 956, 958 may be secured to a support.

The piezoelectric element 900B may also include a valve bearing 926 coupled to (e.g., adhered to, welded to, etc.) the second material 958. By way of example and not limitation, the valve bearing 926 may be positioned at or near a geometric center of the second material 958.

Figure 10A:
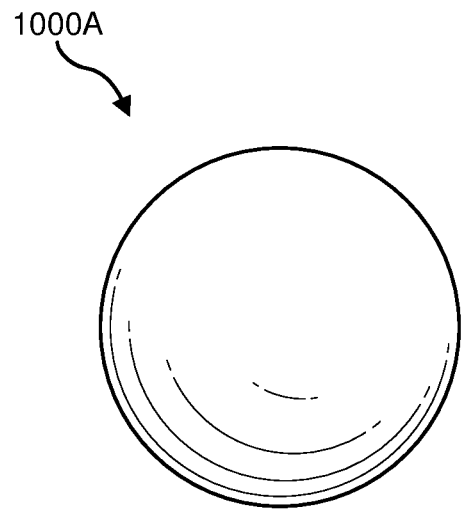
FIGS. 10A-10D illustrate side perspective views of various valve bearings, according to various embodiments of the present disclosure.
Figure 10B:
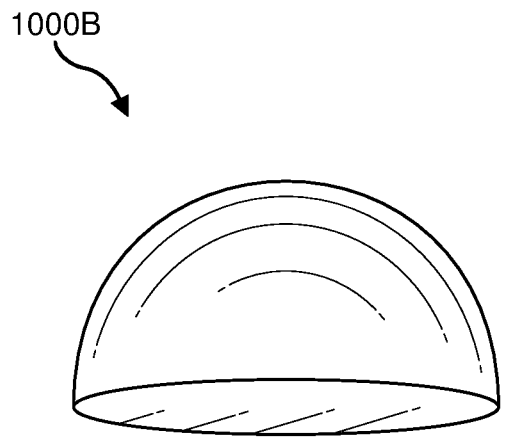
Figure 10C:
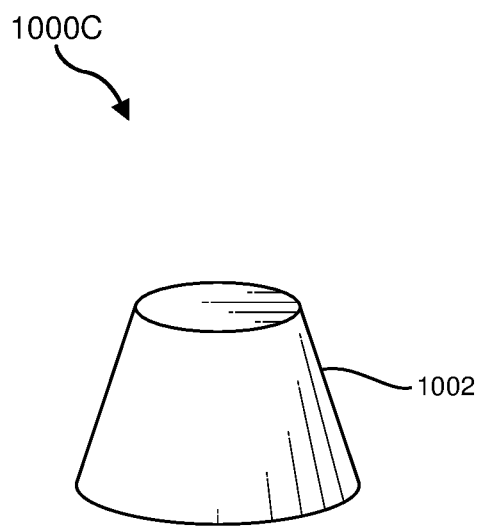
Figure 10D:
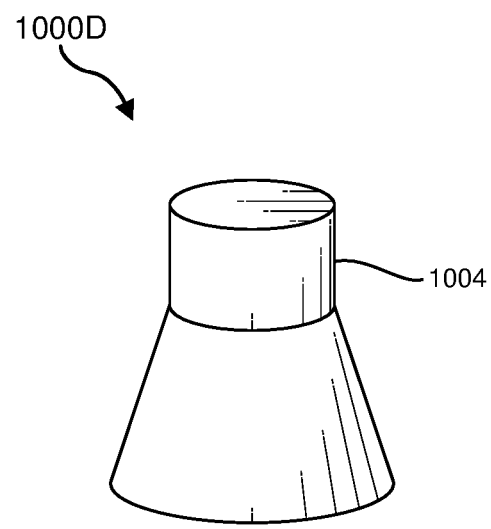

FIGS. 10A-10D illustrate side perspective views of various valve bearings 1000A-1000D, according to various embodiments of the present disclosure. Any of the valve bearings 1000A-1000D may be used in place of the valve bearings 526, 926 described above. As shown in FIG. 10A, the valve bearing 1000A may exhibit a generally spherical shape. As shown in FIG. 10B, the valve bearing 1000B may exhibit a generally hemispherical shape. As shown in FIG. 10C, the valve bearing 1000C may exhibit a generally frustoconical shape. An angle of an outer lateral surface 1002 of the valve bearing 1000C may be related to (e.g., the same as) an angle of a corresponding valve seat. As shown in FIG. 10D, the valve bearing 1000D may exhibit a generally frustoconical shape with a protruding extension 1004. The extension 1004 may facilitate aligning of the valve bearing 1000D with a corresponding valve seat and/or may improve a seal between the valve bearing 1000D and the valve seat. In some examples, the extension 1004 may be cylindrical, conical, frustoconical, or curved.

The configurations of the valve bearings 1000A-1000D are shown by way of example and not limitation. Other configurations and shapes suitable for use as a valve bearing may also be employed. For example, valve bearings according to the present disclosure may also exhibit a spherical shape with an extension, a hemispherical shape with an extension, a conical shape, or a conical shape with an extension. In some examples, the shape of the valve bearing may be selected based on a design and shape of a corresponding valve seat, based on techniques used for coupling the valve bearing to a base material, and/or based on sealing considerations for a particular valve design.

FIG. 11 is a flow diagram illustrating a method 1100 of directing fluid, according to at least one embodiment of the present disclosure. At operation 1110, a fluid may be flowed into a valve chamber via a fluid inlet. Operation 1110 may be performed in a variety of ways. For example, the fluid may be supplied to the fluid inlet from a pump, a pressurized tank, or from another suitable fluid source.

At operation 1120, the fluid may be passed from the fluid inlet through the valve chamber to a first fluid outlet when a piston is in a first position. Operation 1120 may be performed in a variety of ways. For example, the fluid may pass around a central shaft between two enlarged end portions of the piston. The central shaft may be sized to enable fluid to flow around the central shaft within the valve chamber. The first position may be a position at which fluid may be flowed to the first fluid outlet. A second fluid outlet may be at least partially blocked by the piston in the first position.

At operation 1130, the piston may be moved from the first position to a second position by activating a first piezoelectric actuator. Operation 1130 may be performed in a variety of ways. For example, the first piezoelectric actuator may be any of the piezoelectric actuators described above. The first piezoelectric actuator may be activated to an open state to flow fluid through the first piezoelectric actuator to a first piston actuation inlet that is in fluid communication with the valve chamber. The fluid flowing through the first piezoelectric actuator may be diverted from the fluid inlet of the valve chamber. For example, a first valve bearing coupled to a first piezoelectric stack of materials may be moved away (e.g., disengaged) from a first valve seat to enable the fluid to flow through the first piezoelectric actuator (e.g., through the first valve seat). The first valve bearing may be moved away from the first valve bearing by bending the first piezoelectric stack of materials, such as in response to application of a sufficient electrical voltage. The fluid flowing to the first piston actuation inlet may force the piston to move from the first position to the second position. When the piston is in the second position, fluid may be allowed to flow to the second fluid outlet and the first fluid outlet may be at least partially blocked by the piston.

At operation 1140, fluid may be passed from the fluid inlet through the valve chamber to the second fluid outlet when the piston is in the second position. Operation 1140 may be performed in a variety of ways. For example, the fluid may pass from the fluid inlet around the central shaft of the piston to the second fluid outlet.

At operation 1150, the piston may be moved to from the second position to the first position by activating a second piezoelectric actuator. Operation 1150 may be performed in a variety of ways. For example, the second piezoelectric actuator may be any of the piezoelectric actuators described above. The second piezoelectric actuator may be activated to an open state to flow fluid through the second piezoelectric actuator to a second piston actuation inlet that is in fluid communication with the valve chamber. The fluid flowing through the second piezoelectric actuator may be diverted from the fluid inlet of the valve chamber. For example, a second valve bearing coupled to a second piezoelectric stack of materials may be moved away (e.g., disengaged) from a second valve seat to enable the fluid to flow through the second piezoelectric actuator (e.g., through the second valve seat). The second valve bearing may be moved away from the second valve bearing by bending the second piezoelectric stack of materials, such as in response to application of a sufficient electrical voltage. The fluid flowing to the second piston actuation inlet may force the piston to move from the second position to the first position. In some examples, pressure behind the piston may be released, such as through a pressure relief feature, to facilitate the movement of the piston from the second position to the first position.

In some examples, after the piston is moved between the first position and the second position (e.g., at operation 1130 and/or operation 1150), the first piezoelectric actuator and/or the second piezoelectric actuator may be deactivated. The piston may be maintained in its position while the first piezoelectric actuator and the second piezoelectric actuator are deactivated. Thus, the piston and valve chamber may be configured to maintain the piston in position without an application of pressure or energy.

In some examples, fluid may be flowed through at least one of the first fluid outlet and/or the second fluid outlet to a haptic feedback device that is configured to provide haptic feedback to an intended user. For example, fluid may be flowed to an inflatable bladder, a rotating element (e.g., an eccentric rotating mass), or another element of a haptic feedback device (e.g., a wearable device).

FIG. 12 is a flow diagram illustrating a method 1200 of forming a fluidic device, according to at least one embodiment of the present disclosure. At operation 1210, a piston may be positioned within a valve chamber. Operation 1210 may be performed in a variety of ways. For example, the piston that is positioned within the valve chamber may include a central shaft and two enlarged end portions.

At operation 1220, a fluidic inlet may be fluidically coupled to the valve chamber. Operation 1220 may be performed in a variety of ways. For example, a hole may be cut in a side of the valve chamber to form the fluidic inlet. In some examples, an inlet extension may be coupled to the valve chamber to provide a conduit-coupling feature.

At operation 1230, a first fluid outlet and a second fluid outlet may be fluidically coupled to the valve chamber. Operation 1230 may be performed in a variety of ways. For example, two respective holes may be cut into the valve chamber to form the first fluid outlet and the second fluid outlet. In some examples, a first outlet extension may be coupled to the valve chamber at the first fluid outlet and a second outlet extension may be coupled to the valve chamber at the second fluid outlet.

At operation 1240, a first piezoelectric actuator may be fluidically coupled to the valve chamber for moving the piston from a first position to a second position. Operation 1240 may be performed in a variety of ways. For example, any of the piezoelectric actuators described above may be coupled to the valve chamber such that an actuator outlet of the first piezoelectric actuator is in fluid communication with a first piston actuation inlet of the valve chamber.

At operation 1250, a second piezoelectric actuator may be fluidically coupled to the valve chamber for moving the piston from the second position to the first position. Operation 1250 may be performed in a variety of ways. For example, any of the piezoelectric actuators described above may be coupled to the valve chamber such that an actuator outlet of the second piezoelectric actuator is in fluid communication with a second piston actuation inlet of the valve chamber. In some embodiments, the second piston actuation inlet may be on an opposite side of the valve chamber from the first piston actuation inlet.

In some embodiments, the method 1200 may further include forming each of the first piezoelectric actuator and the second piezoelectric actuator. The formation of each of these piezoelectric actuators may include coupling a valve bearing to a piezoelectric stack of a first material and a second material and positioning a valve seat adjacent to the valve bearing such that the valve bearing engages with the valve seat in a closed position and disengages from the valve seat in an open position.

Accordingly, embodiments of the present disclosure include fluidic devices, systems, and methods that may include actuation by piezoelectric actuators. The piezoelectric actuators may include a valve bearing on a piezoelectric bimorph stack of materials. When activated, the piezoelectric stack of materials may move the valve bearing between a closed position abutting a valve seat and an open position disengaged from the valve seat. Such piezoelectric actuators may be used to selectively provide fluid flow to a valve chamber to move a piston between a first position and a second position to respectively flow fluid through a first fluid outlet and/or a second fluid outlet. The piezoelectric actuators may exhibit a fast response time and low energy consumption, which may improve operation of fluidic devices (e.g., fluidic switches, fluidic oscillators, etc.). Additionally, the fluidic devices may be less expensive than some conventional fluidic devices that are actuated in other ways.

The fluidic devices described herein may be implemented in artificial-reality systems. Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1300 in FIG. 13) or that visually immerses a user in an artificial reality (such as, e.g., virtual-reality system 1400 in FIG. 14). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 13:
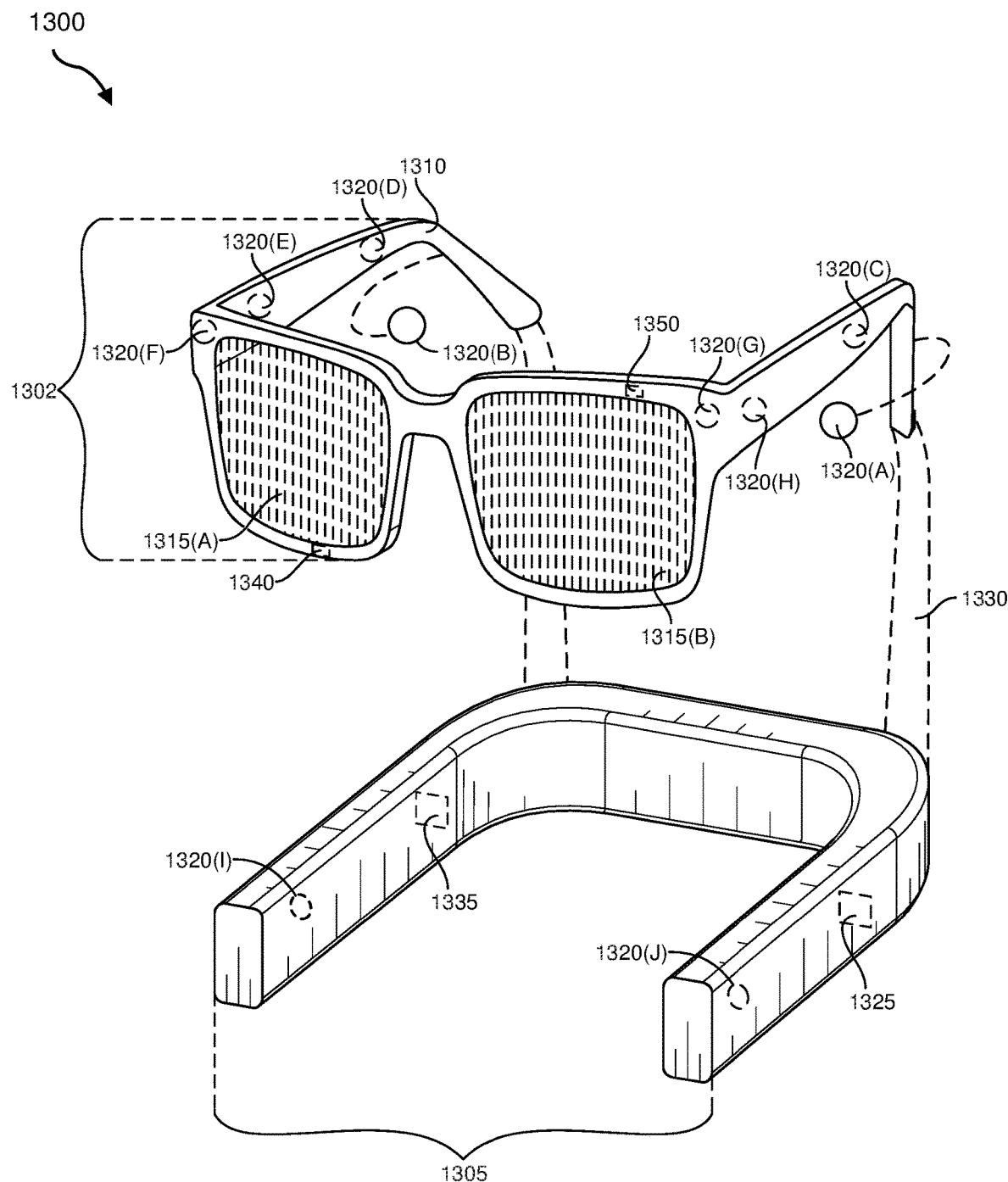
FIG. 13 is an illustration of example augmented-reality glasses that may be used in connection with embodiments of this disclosure.

Turning to FIG. 13, the augmented-reality system 1300 may include an eyewear device 1302 with a frame 1310 configured to hold a left display device 1315(A) and a right display device 1315(B) in front of a user's eyes. The display devices 1315(A) and 1315(B) may act together or independently to present an image or series of images to a user. While the augmented-reality system 1300 includes two displays, embodiments of this disclosure may be implemented in augmented-reality systems with a single NED or more than two NEDs.

In some embodiments, the augmented-reality system 1300 may include one or more sensors, such as sensor 1340. The sensor 1340 may generate measurement signals in response to motion of the augmented-reality system 1300 and may be located on substantially any portion of the frame 1310. The sensor 1340 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1300 may or may not include the sensor 1340 or may include more than one sensor. In embodiments in which the sensor 1340 includes an IMU, the IMU may generate calibration data based on measurement signals from the sensor 1340. Examples of the sensor 1340 may include, without limitation, accelerometers, gyroscopes, magnetometers, other suitable types of sensors that detect motion, sensors used for error correction of the IMU, or some combination thereof.

In some examples, the augmented-reality system 1300 may also include a microphone array with a plurality of acoustic transducers 1320(A)-1320(J), referred to collectively as acoustic transducers 1320. The acoustic transducers 1320 may represent transducers that detect air pressure variations induced by sound waves. Each of the acoustic transducers 1320 may be configured to detect sound and convert the detected sound into an electronic format (e.g., an analog or digital format). The microphone array in FIG. 14 may include, for example, ten acoustic transducers: 1320(A) and 1320(B), which may be designed to be placed inside a corresponding ear of the user, acoustic transducers 1320(C), 1320(D), 1320(E), 1320(F), 1320(G), and 1320(H), which may be positioned at various locations on the frame 1310, and/or acoustic transducers 1320(I) and 1320(J), which may be positioned on a corresponding neckband 1305.

In some embodiments, one or more of the acoustic transducers 1320(A)-(F) may be used as output transducers (e.g., speakers). For example, the acoustic transducers 1320(A) and/or 1320(B) may be earbuds or any other suitable type of headphone or speaker.

The configuration of the acoustic transducers 1320 of the microphone array may vary. While the augmented-reality system 1300 is shown in FIG. 13 as having ten acoustic transducers 1320, the number of acoustic transducers 1320 may be greater or less than ten. In some embodiments, using higher numbers of acoustic transducers 1320 may increase the amount of audio information collected and/or the sensitivity and accuracy of the audio information. In contrast, using a lower number of acoustic transducers 1320 may decrease the computing power required by an associated controller 1350 to process the collected audio information. In addition, the position of each acoustic transducer 1320 of the microphone array may vary. For example, the position of an acoustic transducer 1320 may include a defined position on the user, a defined coordinate on the frame 1310, an orientation associated with each acoustic transducer 1320, or some combination thereof.

The acoustic transducers 1320(A) and 1320(B) may be positioned on different parts of the user's ear, such as behind the pinna, behind the tragus, and/or within the auricle or fossa. Or, there may be additional acoustic transducers 1320 on or surrounding the ear in addition to the acoustic transducers 1320 inside the ear canal. Having an acoustic transducer 1320 positioned next to an ear canal of a user may enable the microphone array to collect information on how sounds arrive at the ear canal. By positioning at least two of the acoustic transducers 1320 on either side of a user's head (e.g., as binaural microphones), the augmented-reality device 1300 may simulate binaural hearing and capture a 3D stereo sound field around about a user's head. In some embodiments, the acoustic transducers 1320(A) and 1320(B) may be connected to the augmented-reality system 1300 via a wired connection 1330, and in other embodiments the acoustic transducers 1320(A) and 1320(B) may be connected to the augmented-reality system 1300 via a wireless connection (e.g., a Bluetooth connection). In still other embodiments, the acoustic transducers 1320(A) and 1320(B) may not be used at all in conjunction with the augmented-reality system 1300.

The acoustic transducers 1320 on the frame 1310 may be positioned in a variety of different ways, including along the length of the temples, across the bridge, above or below the display devices 1315(A) and 1315(B), or some combination thereof. The acoustic transducers 1320 may also be oriented such that the microphone array is able to detect sounds in a wide range of directions surrounding the user wearing the augmented-reality system 1300. In some embodiments, an optimization process may be performed during manufacturing of the augmented-reality system 1300 to determine relative positioning of each acoustic transducer 1320 in the microphone array.

In some examples, the augmented-reality system 1300 may include or be connected to an external device (e.g., a paired device), such as neckband 1305. The neckband 1305 generally represents any type or form of paired device. Thus, the following discussion of the neckband 1305 may also apply to various other paired devices, such as charging cases, smart watches, smart phones, wrist bands, other wearable devices, handheld controllers, tablet computers, laptop computers, other external compute devices, etc.

As shown, the neckband 1305 may be coupled to the eyewear device 1302 via one or more connectors. The connectors may be wired or wireless and may include electrical and/or non-electrical (e.g., structural) components. In some cases, the eyewear device 1302 and the neckband 1305 may operate independently without any wired or wireless connection between them. While FIG. 13 illustrates the components of the eyewear device 1302 and the neckband 1305 in example locations on the eyewear device 1302 and neckband 1305, the components may be located elsewhere and/or distributed differently on the eyewear device 1302 and/or neckband 1305. In some embodiments, the components of the eyewear device 1302 and neckband 1305 may be located on one or more additional peripheral devices paired with the eyewear device 1302, the neckband 1305, or some combination thereof.

Pairing external devices, such as the neckband 1305, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1300 may be provided by a paired device or shared between a paired device and an eyewear device, thus reducing the weight, heat profile, and form factor of the eyewear device overall while still retaining desired functionality. For example, the neckband 1305 may allow components that would otherwise be included on an eyewear device to be included in the neckband 1305 since users may tolerate a heavier weight load on their shoulders than they would tolerate on their heads. The neckband 1305 may also have a larger surface area over which to diffuse and disperse heat to the ambient environment. Thus, the neckband 1305 may allow for greater battery and computation capacity than might otherwise have been possible on a stand-alone eyewear device. Since weight carried in the neckband 1305 may be less invasive to a user than weight carried in the eyewear device 1302, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1305 may be communicatively coupled with the eyewear device 1302 and/or to other devices. These other devices may provide certain functions (e.g., tracking, localizing, depth mapping, processing, storage, etc.) to the augmented-reality system 1300. In the embodiment of FIG. 13, the neckband 1305 may include two acoustic transducers (e.g., 1320(I) and 1320(J)) that are part of the microphone array (or potentially form their own microphone subarray). The neckband 1305 may also include a controller 1325 and a power source 1335.

The acoustic transducers 1320(I) and 1320(J) of the neckband 1305 may be configured to detect sound and convert the detected sound into an electronic format (analog or digital). In the embodiment of FIG. 13, the acoustic transducers 1320(I) and 1320(J) may be positioned on the neckband 1305, thereby increasing the distance between the neckband acoustic transducers 1320(I) and 1320(J) and the other acoustic transducers 1320 positioned on the eyewear device 1302. In some cases, increasing the distance between the acoustic transducers 1320 of the microphone array may improve the accuracy of beamforming performed via the microphone array. For example, if a sound is detected by the acoustic transducers 1320(C) and 1320(D) and the distance between the acoustic transducers 1320(C) and 1320(D) is greater than, e.g., the distance between the acoustic transducers 1320(D) and 1320(E), the determined source location of the detected sound may be more accurate than if the sound had been detected by the acoustic transducers 1320(D) and 1320(E).

The controller 1325 of the neckband 1305 may process information generated by the sensors on the neckband 1305 and/or the augmented-reality system 1300. For example, the controller 1325 may process information from the microphone array that describes sounds detected by the microphone array. For each detected sound, the controller 1325 may perform a direction-of-arrival (DOA) estimation to estimate a direction from which the detected sound arrived at the microphone array. As the microphone array detects sounds, the controller 1325 may populate an audio data set with the information. In embodiments in which the augmented-reality system 1300 includes an inertial measurement unit, the controller 1325 may compute all inertial and spatial calculations from the IMU located on the eyewear device 1302. A connector may convey information between the augmented-reality system 1300 and the neckband 1305 and between the augmented-reality system 1300 and the controller 1325. The information may be in the form of optical data, electrical data, wireless data, or any other transmittable data form. Moving the processing of information generated by the augmented-reality system 1300 to the neckband 1305 may reduce weight and heat in the eyewear device 1302, making it more comfortable to the user.

The power source 1335 in the neckband 1305 may provide power to the eyewear device 1302 and/or to the neckband 1305. The power source 1335 may include, without limitation, lithium ion batteries, lithium-polymer batteries, primary lithium batteries, alkaline batteries, or any other form of power storage. In some cases, the power source 1335 may be a wired power source. Including the power source 1335 on the neckband 1305 instead of on the eyewear device 1302 may help better distribute the weight and heat generated by the power source 1335.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 1400 in FIG. 14, that mostly or completely covers a user's field of view. The virtual-reality system 1400 may include a front rigid body 1402 and a band 1404 shaped to fit around a user's head. The virtual-reality system 1400 may also include output audio transducers 1406(A) and 1406(B). Furthermore, while not shown in FIG. 14, the front rigid body 1402 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1300 and/or the virtual-reality system 1400 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in the augmented-reality system 1300 and/or virtual-reality system 1400 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1300 and/or virtual-reality system 1400 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the artificial-reality systems 1300 and 1400 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 15:
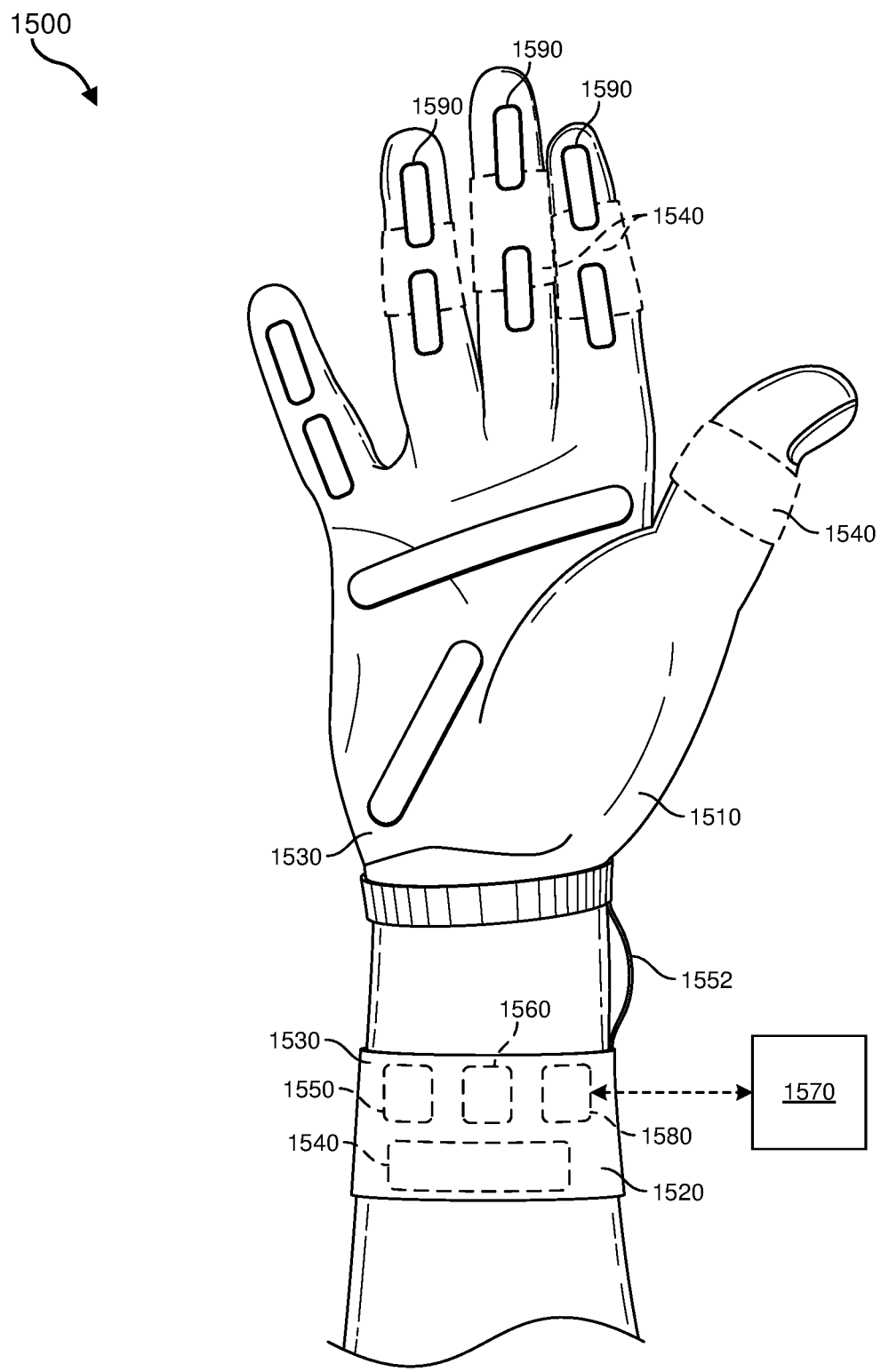
FIG. 15 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 15 illustrates a vibrotactile system 1500 in the form of a wearable glove (haptic device 1510) and wristband (haptic device 1520). The haptic device 1510 and haptic device 1520 are shown as examples of wearable devices that include a flexible, wearable textile material 1530 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1540 may be positioned at least partially within one or more corresponding pockets formed in the textile material 1530 of the vibrotactile system 1500. The vibrotactile devices 1540 may be positioned in locations to provide a vibrating sensation (e.g., haptic feedback) to a user of the vibrotactile system 1500. For example, the vibrotactile devices 1540 may be positioned against the user's finger(s), thumb, or wrist, as shown in FIG. 15. The vibrotactile devices 1540 may, in some examples, be sufficiently flexible to conform to or bend with the user's corresponding body part(s).

A power source 1550 (e.g., a battery) for applying a voltage to the vibrotactile devices 1540 for activation thereof may be electrically coupled to the vibrotactile devices 1540, such as via conductive wiring 1552. In some examples, each of the vibrotactile devices 1540 may be independently electrically coupled to the power source 1550 for individual activation. In some embodiments, a processor 1560 may be operatively coupled to the power source 1550 and configured (e.g., programmed) to control activation of the vibrotactile devices 1540.

The vibrotactile system 1500 may be implemented in a variety of ways. In some examples, the vibrotactile system 1500 may be a standalone system with integral subsystems and components for operation independent of other devices and systems. As another example, the vibrotactile system 1500 may be configured for interaction with another device or system 1570. For example, the vibrotactile system 1500 may, in some examples, include a communications interface 1580 for receiving and/or sending signals to the other device or system 1570. The other device or system 1570 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1580 may enable communications between the vibrotactile system 1500 and the other device or system 1570 via a wireless (e.g., Wi-Fi, Bluetooth, cellular, radio, etc.) link or a wired link. If present, the communications interface 1580 may be in communication with the processor 1560, such as to provide a signal to the processor 1560 to activate or deactivate one or more of the vibrotactile devices 1540.

The vibrotactile system 1500 may optionally include other subsystems and components, such as touch-sensitive pads 1590, pressure sensors, motion sensors, position sensors, lighting elements, and/or user interface elements (e.g., an on/off button, a vibration control element, etc.). During use, the vibrotactile devices 1540 may be configured to be activated for a variety of different reasons, such as in response to the user's interaction with user interface elements, a signal from the motion or position sensors, a signal from the touch-sensitive pads 1590, a signal from the pressure sensors, a signal from the other device or system 1570, etc.

Although the power source 1550, processor 1560, and communications interface 1580 are illustrated in FIG. 15 as being positioned in the haptic device 1520, the present disclosure is not so limited. For example, one or more of the power source 1550, processor 1560, or communications interface 1580 may be positioned within the haptic device 1510 or within another wearable textile.

Figure 16:
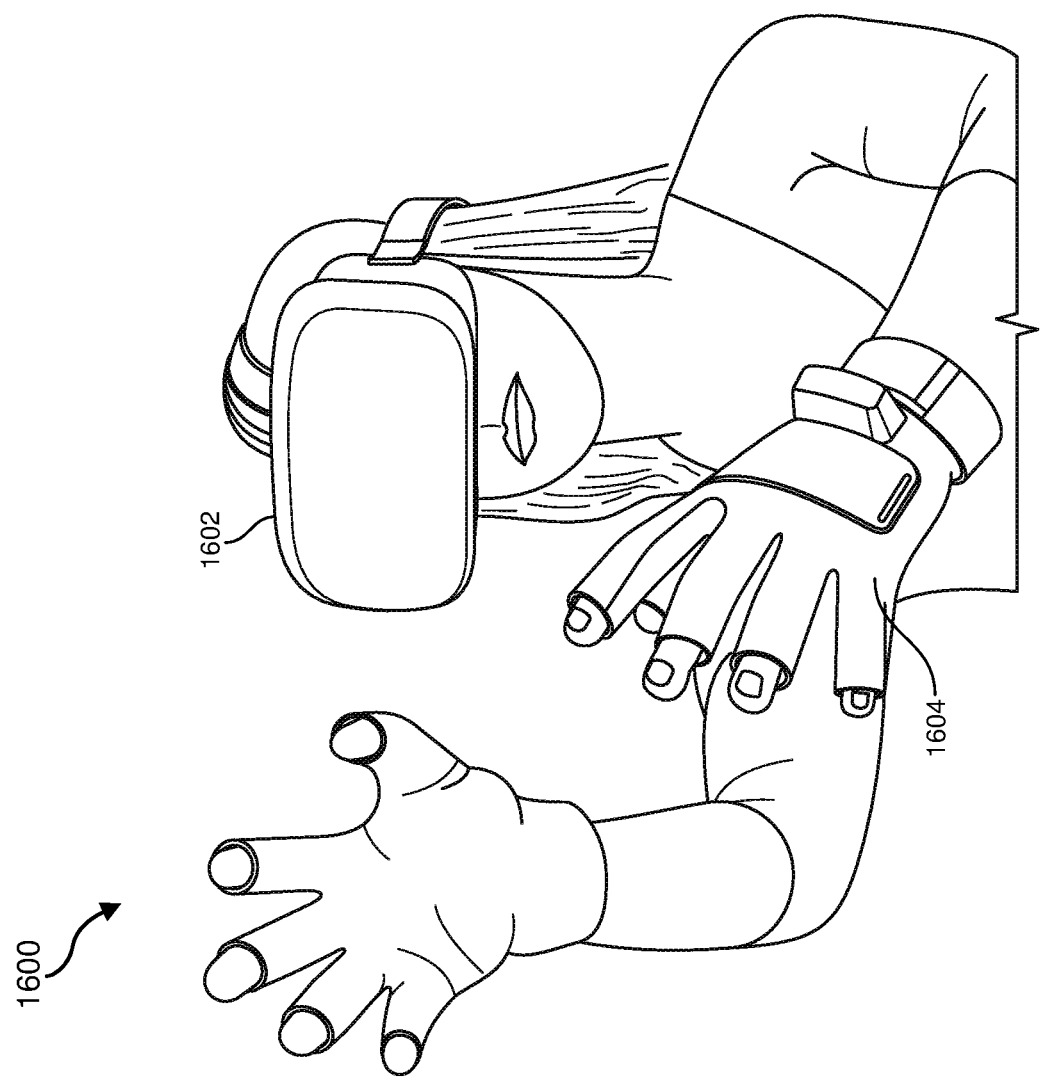
FIG. 16 is an illustration of an example virtual-reality environment according to embodiments of this disclosure.

Haptic wearables, such as those shown in and described in connection with FIG. 15, may be implemented in a variety of types of artificial-reality systems and environments. FIG. 16 shows an example artificial-reality environment 1600 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 14:
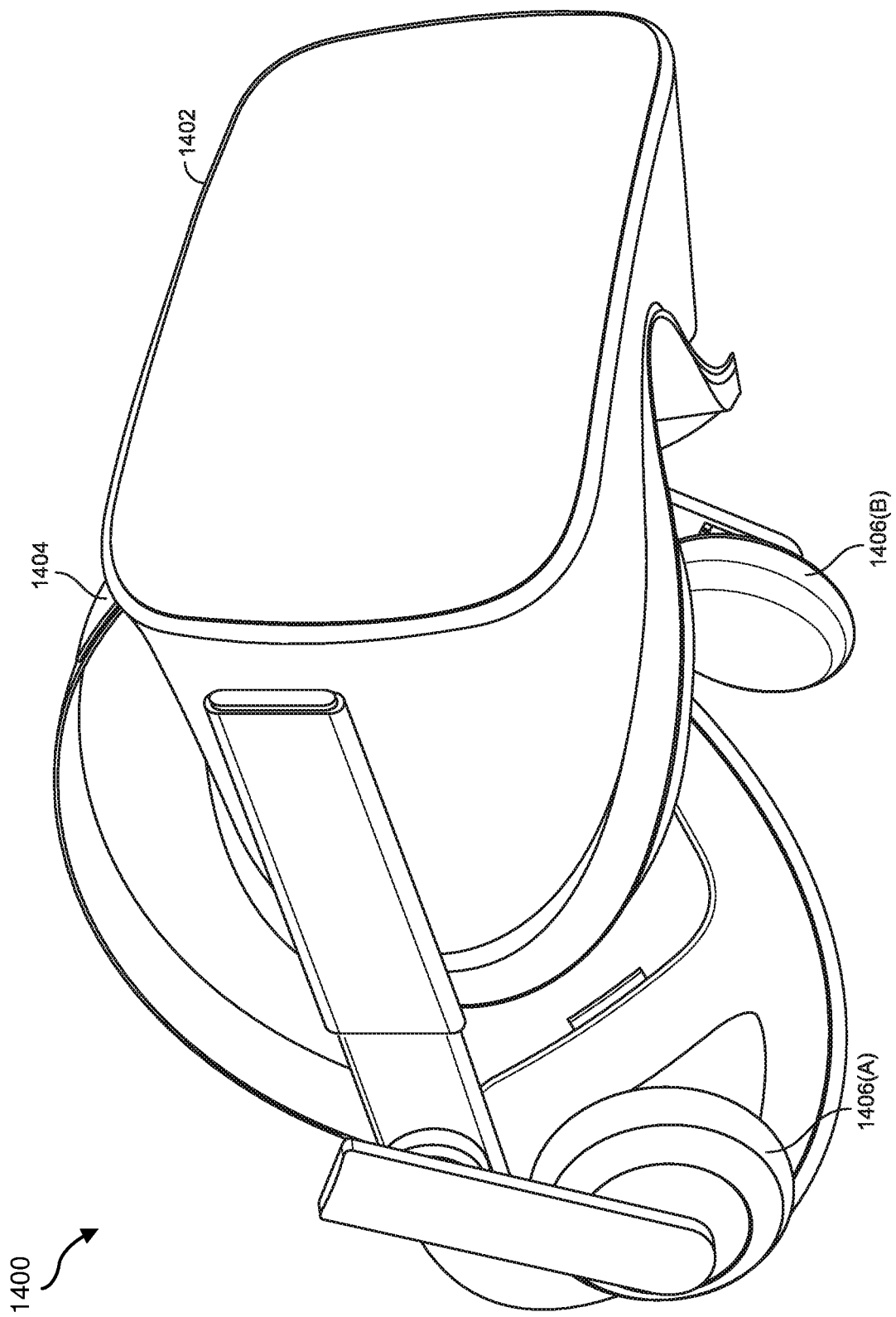
FIG. 14 is an illustration of an example virtual-reality headset that may be used in connection with embodiments of this disclosure.

Head-mounted display 1602 generally represents any type or form of virtual-reality system, such as the virtual-reality system 1400 in FIG. 14. Haptic device 1604 generally represents any type or form of wearable device, worn by a user of an artificial-reality system, that provides haptic feedback to the user to give the user the perception that he or she is physically engaging with a virtual object. In some embodiments, the haptic device 1604 may provide haptic feedback by applying vibration, motion, and/or force to the user. For example, the haptic device 1604 may limit or augment a user's movement. To give a specific example, the haptic device 1604 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use the haptic device 1604 to send action requests to a console. Examples of action requests include, without limitation, requests to start an application and/or end the application and/or requests to perform a particular action within the application.

Figure 17:
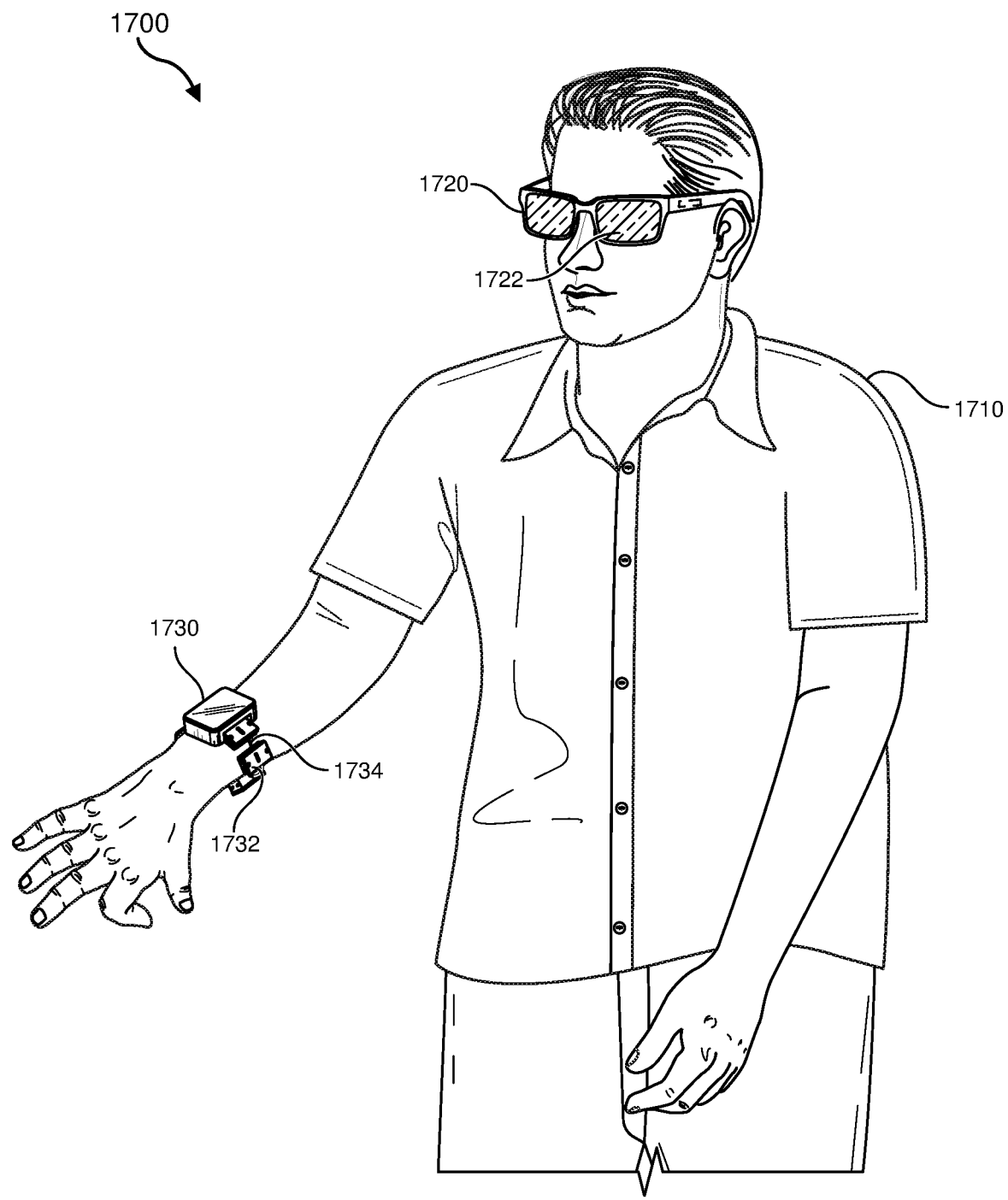
FIG. 17 is an illustration of an example augmented-reality environment according to embodiments of this disclosure.

While haptic interfaces may be used with virtual-reality systems, as shown in FIG. 16, haptic interfaces may also be used with augmented-reality systems, as shown in FIG. 17. FIG. 17 is a perspective view of a user 1710 interacting with an augmented-reality system 1700. In this example, the user 1710 may wear a pair of augmented-reality glasses 1720 that may have one or more displays 1722 and that are paired with a haptic device 1730. In this example, the haptic device 1730 may be a wristband that includes a plurality of band elements 1732 and a tensioning mechanism 1734 that connects band elements 1732 to one another.

One or more of the band elements 1732 may include any type or form of actuator suitable for providing haptic feedback. For example, one or more of the band elements 1732 may be configured to provide one or more of various types of cutaneous feedback, including vibration, force, traction, texture, and/or temperature. To provide such feedback, the band elements 1732 may include one or more of various types of actuators. In one example, each of the band elements 1732 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 1510, 1520, 1604, and 1730 may include any suitable number and/or type of haptic transducer, sensor, and/or feedback mechanism. For example, the haptic devices 1510, 1520, 1604, and 1730 may include one or more mechanical transducers, piezoelectric transducers, and/or fluidic transducers. The haptic devices 1510, 1520, 1604, and 1730 may also include various combinations of different types and forms of transducers that work together or independently to enhance a user's artificial-reality experience. In one example, each of the band elements 1732 of the haptic device 1730 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A fluidic device may include: a valve chamber in a valve body; a fluid inlet into the valve chamber; a piston positioned within the valve chamber; a first fluid outlet for passing fluid out of the valve chamber when the piston is in a first position; a second fluid outlet for passing fluid out of the valve chamber when the piston is in a second position; a first piezoelectric actuator positioned and configured for moving the piston from the first position to the second position; and a second piezoelectric actuator positioned and configured for moving the piston from the second position to the first position.

Example 2: The fluidic device of Example 1, wherein each of the first piezoelectric actuator and the second piezoelectric actuator includes: a first material and a second material stacked over the first material; a valve seat; and a valve bearing coupled to the second material and positioned to engage the valve seat in a first position and to disengage from the valve seat in a second position.

Example 3: The fluidic device of Example 2, wherein the valve seat includes at least one of a ceramic material, a metal material, a polymeric material, or a composite material.

Example 4: The fluidic device of Example 2 or 3, wherein the valve seat includes: a valve seat body; a concave conical bearing surface in the valve seat body; and a cylindrical hole extending through the valve seat body to the concave conical bearing surface.

Example 5: The fluidic device of any of Examples 2 through 4, wherein each of the first material and the second material has a disk shape.

Example 6: The fluidic device of any of Examples 2 through 4, wherein each of the first material and the second material has a rectangular shape.

Example 7: The fluidic device of any of Examples 2 through 6, wherein the valve bearing is coupled to the second material at a geometric center of the second material.

Example 8: The fluidic device of any of Examples 2 through 7, wherein the valve bearing is coupled to the second material via at least one of: an adhesive; or a weld.

Example 9: The fluidic device of any of Examples 2 through 8, wherein the valve bearing has a shape selected from the group consisting of: spherical, hemispherical, conical, frustoconical, spherical with an extension; hemispherical with an extension, conical with an extension, or frustoconical with an extension.

Example 10: The fluidic device of any of Examples 1 through 9, wherein each of the first piezoelectric actuator and the second piezoelectric actuator includes: an actuator inlet; and an actuator outlet.

Example 11: The fluidic device of Example 10, wherein: the actuator inlet is in fluid communication with the fluid inlet; and the actuator outlet is in fluid communication with the valve chamber.

Example 12: The fluidic device of any of Examples 1 through 11, wherein the fluidic device is configured to maintain flow into the first fluid outlet or into the second fluid outlet when both of the first piezoelectric actuator and the second piezoelectric actuator are in a deactivated state.

Example 13: The fluidic device of any of Examples 1 through 12, wherein an internal diameter of the fluid inlet is about 2 mm or less.

Example 14: A method of directing fluid, which may include: flowing a fluid into a valve chamber via a fluid inlet; passing the fluid from the fluid inlet through the valve chamber to a first fluid outlet when a piston disposed within the valve chamber is in a first position; moving the piston from the first position to a second position by activating a first piezoelectric actuator; passing the fluid from the fluid inlet through the valve chamber to a second fluid outlet when the piston is in the second position; and moving the piston from the second position to the first position by activating a second piezoelectric actuator.

Example 15: The method of Example 14, wherein each of activating the first piezoelectric actuator and activating the second piezoelectric actuator includes bending a piezoelectric stack of a first material and a second material away from a valve seat to disengage a valve bearing coupled to the second material from the valve seat.

Example 16: The method of Example 14 or Example 15, wherein each of moving the piston from the first position to the second position and moving the piston from the second position to the first position includes diverting a portion of the fluid from the fluid inlet and flowing the diverted portion of the fluid through the valve seat and into the valve chamber to apply a pressure to the piston.

Example 17: The method of any of Examples 14 through 16, further including, after moving the piston from the first position to the second position, deactivating the first piezoelectric actuator and maintaining the piston in the second position while the first piezoelectric actuator is deactivated.

Example 18: The method of any of Examples 14 through 17, further including flowing fluid through at least one of the first fluid outlet or the second fluid outlet to a haptic feedback device configured to provide haptic feedback to a user.

Example 19: A method of forming a fluidic device, which may include: positioning a piston within a valve chamber; fluidically coupling a fluidic inlet to the valve chamber; fluidically coupling a first fluid outlet and a second fluid outlet to the valve chamber; fluidically coupling a first piezoelectric actuator to the valve chamber for moving the piston from a first position in which fluid flows to the first fluid outlet and is blocked from the second fluid outlet to a second position in which fluid flows to the second fluid outlet and is blocked from the first fluid outlet; and fluidically coupling a second piezoelectric actuator to the valve chamber for moving the piston from the second position to the first position.

Example 20: The method of Example 19, further including forming each of the first piezoelectric actuator and the second piezoelectric actuator, including: coupling a valve bearing to a piezoelectric stack of a first material and a second material; and positioning a valve seat adjacent to the valve bearing such that the valve bearing engages with the valve seat in a closed position and disengages from the valve seat in an open position.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A fluidic device, comprising:
a valve chamber in a valve body;
a fluid inlet into the valve chamber;
a piston positioned within the valve chamber;
a first fluid outlet for passing fluid out of the valve chamber when the piston is in a first position;
a second fluid outlet for passing fluid out of the valve chamber when the piston is in a second position, wherein the piston in the first position physically blocks and covers the second fluid outlet and the piston in the second position physically blocks and covers the first fluid outlet; and
at least one piezoelectric bimorph actuator configured to bend upon actuation and positioned for moving a valve bearing between an engaged position against a valve seat and a disengaged position away from the valve seat and to thereby move the piston between the first position and the second position; wherein the at least one piezoelectric bimorph actuator comprises: a first material and a second material stacked over the first material; the valve seat; and the valve bearing directly coupled to the second material.

2. The fluidic device of claim 1, wherein the valve seat comprises at least one of a ceramic material, a metal material, a polymeric material, or a composite material.

3. The fluidic device of claim 1, wherein the valve seat comprises:
a valve seat body;
a concave conical bearing surface in the valve seat body; and
a cylindrical hole extending through the valve seat body to the concave conical bearing surface.

4. The fluidic device of claim 1, wherein each of the first material and the second material has a disk shape.

5. The fluidic device of claim 1, wherein each of the first material and the second material has a rectangular shape.

6. The fluidic device of claim 1, wherein the valve bearing is coupled to the second material at a geometric center of the second material.

7. The fluidic device of claim 1, wherein the valve bearing is coupled to the second material via at least one of:
an adhesive; or
a weld.

8. The fluidic device of claim 1, wherein the valve bearing has a shape selected from the group consisting of: spherical, hemispherical, conical, frustoconical, spherical with an extension, hemispherical with an extension, conical with an extension, or frustoconical with an extension.

9. The fluidic device of claim 1, wherein each of the at least one piezoelectric bimorph actuator comprises:
an actuator inlet; and
an actuator outlet.

10. The fluidic device of claim 9, wherein:
the actuator inlet is in fluid communication with the fluid inlet; and
the actuator outlet is in fluid communication with the valve chamber.

11. The fluidic device of claim 1, wherein the at least one piezoelectric bimorph actuator comprises a first piezoelectric bimorph actuator positioned and configured for moving the piston from the first position to the second position and a second piezoelectric bimorph actuator positioned and configured for moving the piston from the second position to the first position, and wherein the fluidic device is configured to maintain flow into the first fluid outlet or into the second fluid outlet when both of the first piezoelectric bimorph actuator and the second piezoelectric bimorph actuator are in a deactivated state.

12. The fluidic device of claim 1, wherein an internal diameter of the fluid inlet is about 2 mm or less.

13. A method of directing fluid, the method comprising:
flowing a fluid into a valve chamber via a fluid inlet;
passing the fluid from the fluid inlet through the valve chamber to a first fluid outlet when a piston disposed in the valve chamber is in a first position;
moving the piston from the first position to a second position by activating at least one piezoelectric bimorph actuator to bend the at least one piezoelectric bimorph actuator and thereby move a valve bearing between a disengaged position away from a valve seat and an engaged position against the valve seat, wherein the piston in the first position physically blocks and covers the second fluid outlet and the piston in the second position physically blocks and covers the first fluid outlet;
passing the fluid from the fluid inlet through the valve chamber to a second fluid outlet when the piston is in the second position; and
moving the piston from the second position to the first position by activating the at least one piezoelectric bimorph actuator to bend the at least one piezoelectric bimorph actuator; wherein the at least one piezoelectric bimorph actuator comprises: a first material and a second material stacked over the first material; the valve seat; and the valve bearing directly coupled to the second material.

14. The method of claim 13, wherein activating the at least one piezoelectric bimorph actuator comprises bending a piezoelectric stack of the first material and the second material.

15. The method of claim 14, wherein each of moving the piston from the first position to the second position and moving the piston from the second position to the first position comprises diverting a portion of the fluid from the fluid inlet and flowing the diverted portion of the fluid through the valve seat and into the valve chamber to apply a pressure to the piston.

16. The method of claim 13, further comprising, after moving the piston from the first position to the second position, deactivating the at least one piezoelectric bimorph actuator and maintaining the piston in the second position while the at least one piezoelectric bimorph actuator is deactivated.

17. The method of claim 13, further comprising flowing the fluid through at least one of the first fluid outlet or the second fluid outlet to a haptic feedback device configured to provide haptic feedback to an intended user.

18. A method of forming a fluidic device, the method comprising:
positioning a piston within a valve chamber;
fluidically coupling a fluidic inlet to the valve chamber;
fluidically coupling a first fluid outlet and a second fluid outlet to the valve chamber; and
fluidically coupling at least one piezoelectric bimorph actuator to the valve chamber, the at least one piezoelectric bimorph actuator being configured to bend upon actuation to move a valve bearing between an engaged position against a valve seat and a disengaged position away from the valve seat for moving the piston between a first position in which fluid flows to the first fluid outlet and the second fluid outlet is physically blocked and covered by the piston and a second position in which fluid flows to the second fluid outlet and the first fluid outlet is physically blocked and covered by the piston; forming the at least one piezoelectric bimorph actuator, comprising: directly coupling the valve bearing to a piezoelectric stack of a first material and a second material; and positioning the valve seat adjacent to the valve bearing.

\* \* \* \* \*